Sept. 19, 1961 G. G. LIGHT ET AL 3,001,009
TELEGRAPH WAY STATION SELECTOR
Filed Dec. 19, 1957 15 Sheets-Sheet 1
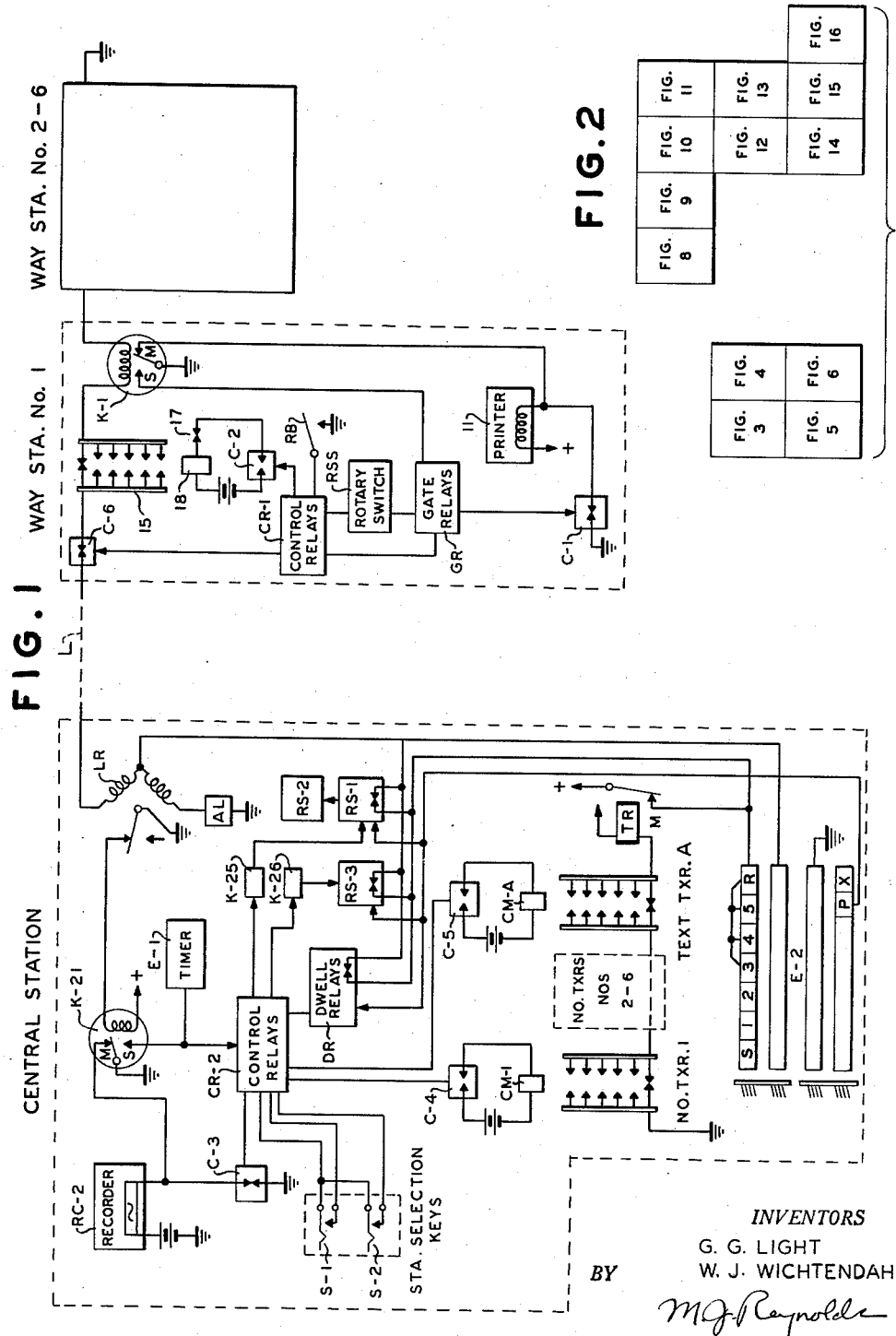
INVENTORS
G. G. LIGHT
W. J. WICHTENDAHL
BY
M. J. Reynolds
ATTORNEY

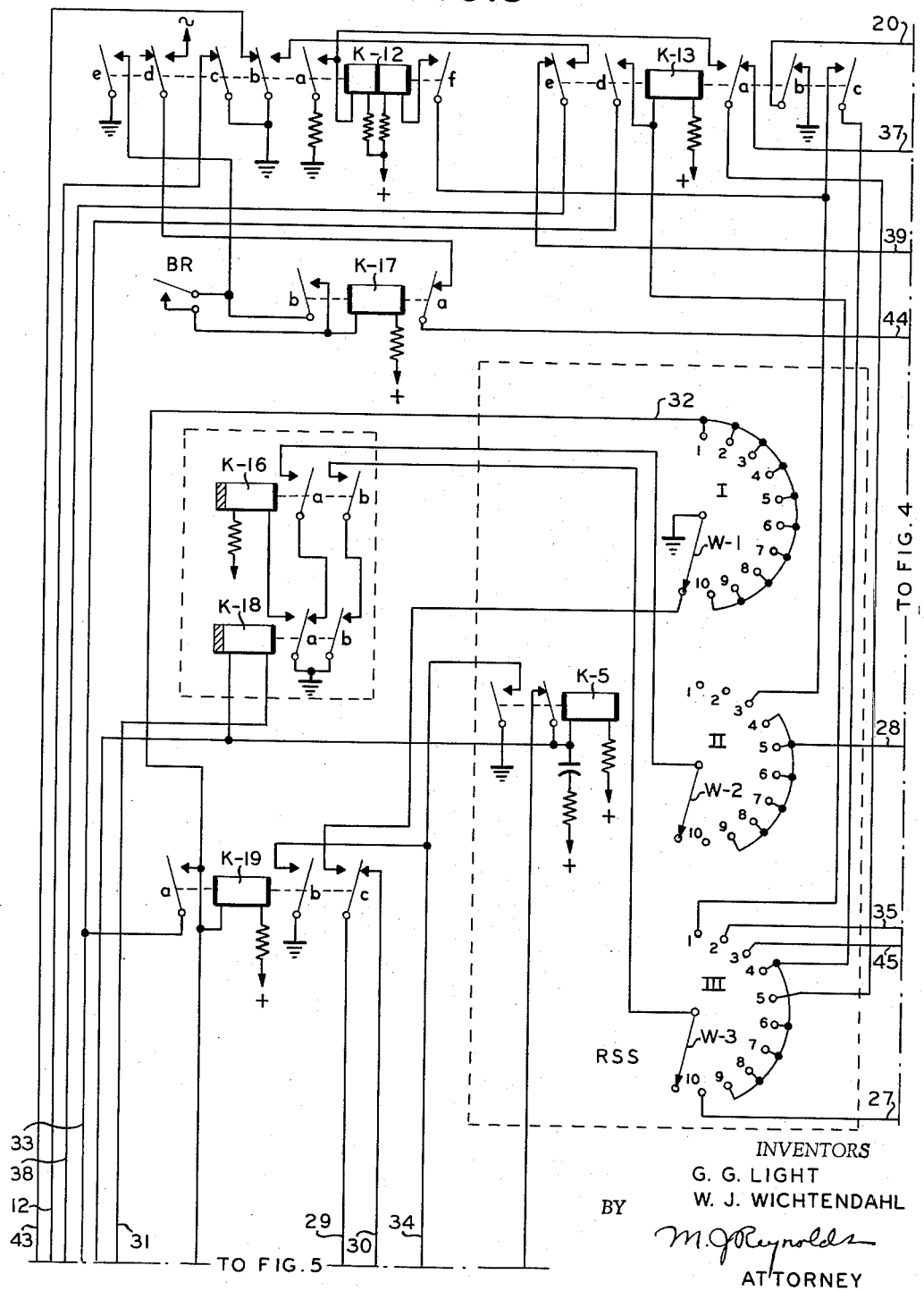

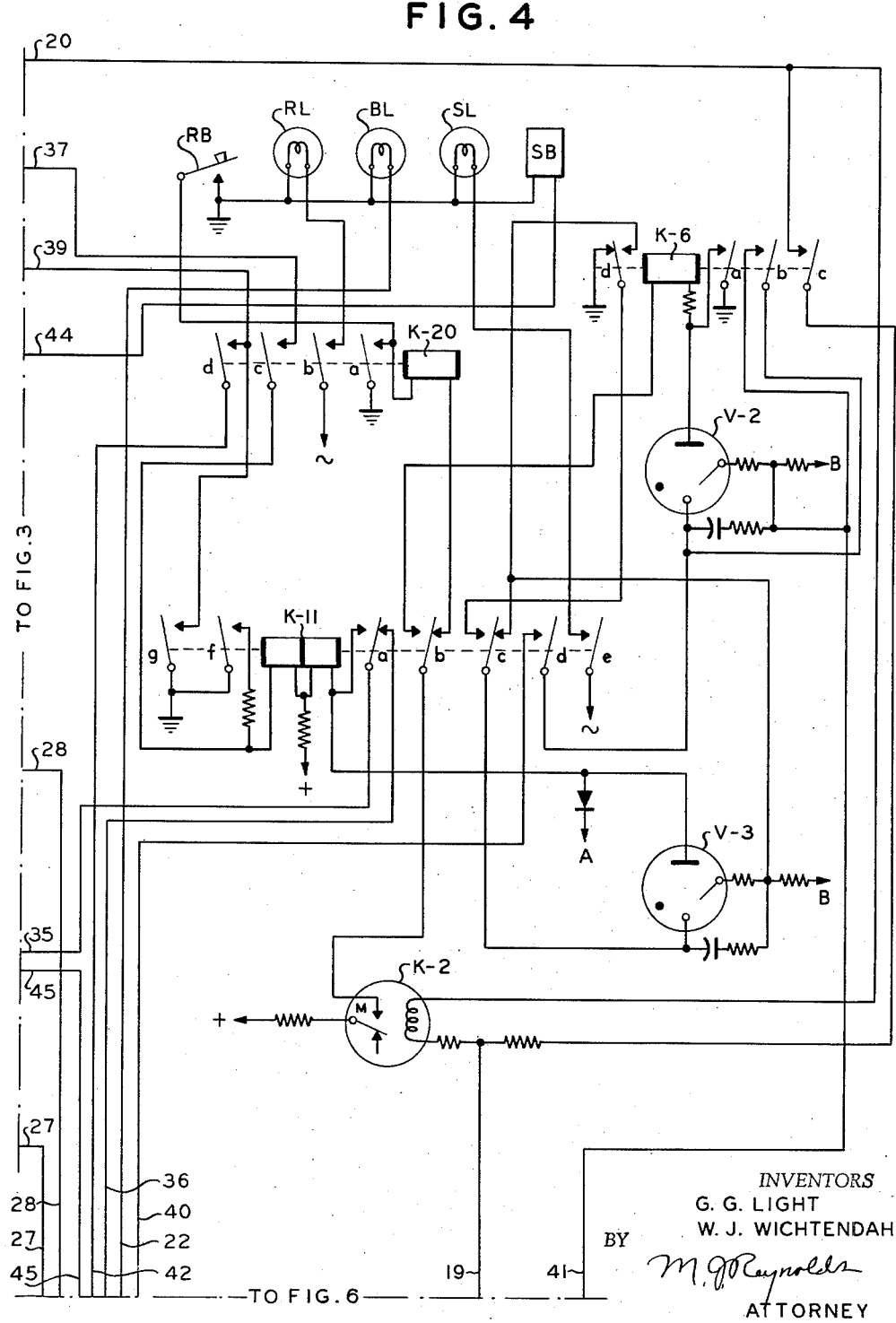

Sept. 19, 1961   G. G. LIGHT ET AL   3,001,009
TELEGRAPH WAY STATION SELECTOR
Filed Dec. 19, 1957   15 Sheets-Sheet 4

INVENTORS
G. G. LIGHT
W. J. WICHTENDAHL
BY M. J. Reynolds
ATTORNEY

Sept. 19, 1961  G. G. LIGHT ET AL  3,001,009
TELEGRAPH WAY STATION SELECTOR
Filed Dec. 19, 1957  15 Sheets-Sheet 5

INVENTORS
G. G. LIGHT
W. J. WICHTENDAHL
BY M. J. Reynolds
ATTORNEY

Sept. 19, 1961

G. G. LIGHT ET AL 3,001,009

TELEGRAPH WAY STATION SELECTOR

Filed Dec. 19, 1957

INVENTORS
G. G. LIGHT
W. J. WICHTENDAHL
BY M. J. Reynolds
ATTORNEY 3,001,009
TELEGRAPH WAY STATION SELECTOR
George G. Light, Scarsdale, and William J. Wichtendahl, New York, N.Y., assignors to The Western Union Telegraph Company, New York, N.Y., a corporation of New York
Filed Dec. 19, 1957, Ser. No. 703,899
14 Claims. (Cl. 178—2)

This invention relates to a way station selector for a telegraph system and more particularly to a system wherein a central station may select any one of a plurality of way stations for transmission thereto or invite any of the way stations to transmit to the central station.

The invention is shown with particular reference to a half-duplex telegraph way station system but is equally well applicable to full duplex operation.

The present invention is particularly applicable to a way-wire circuit where it is not feasible to utilize the regular printing telegraph equipment for selecting functions because of non-uniformity of types of apparatus, different signaling speeds, incompatible regenerative repeaters, and the like. Another important reason is that under some circumstances printers might be caused to print spurious characters in response to a selecting character and this is not tolerable on circuits which handle encrypted messages.

One of the objects of the present system is to provide a way-wire selector which will operate independently of the regular message transmitter-distributor and printer at the central office and each of the tributary stations.

A further object is to provide such a station selector which is independent of normal permutation code signals and which will operate solely on timed pulse sequences.

A still further object is to provide such a way station selector in which each way station is invited to transmit, in turn, so that each station has equal opportunity to transmit to the central station.

Still another object is to provide a system whereby any way station may request the transmission of a series of invitation cycles by the central station and in which the central station may, in the absence of any such request, initiate such a series of invitation cycles.

Another object is to provide a way-wire station selector in which the central station may select any particular way station to the exclusion of others, for transmission to such selected station and may cut-out such selected station at the end of the period of transmission.

A still further object is to prevent the initiation of an invitation cycle by the central office while any way station is under selection for transmission thereto by the central office.

Other objects and advantages will hereinafter appear.

The invention will best be understood by reference to the accompanying drawings in which:

FIG. 1 is a schematic diagram of the central station and way station control circuits;

FIG. 2 illustrates the manner in which FIGS. 3 to 6 and 8 to 16 of the drawings are combined;

FIGS. 3 to 6 illustrate the way-station equipment and circuitry;

Figure 5:
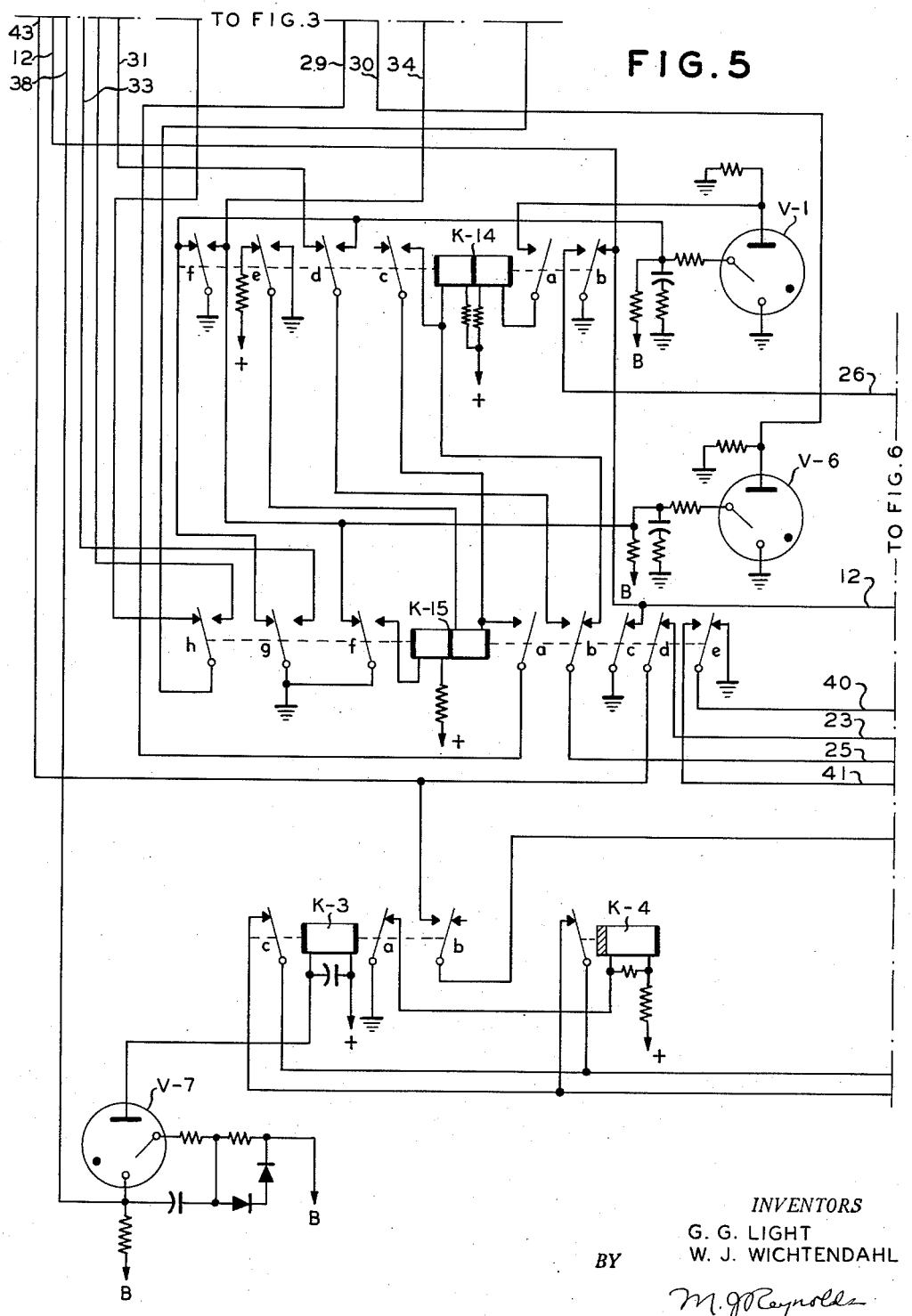
Figure 6:
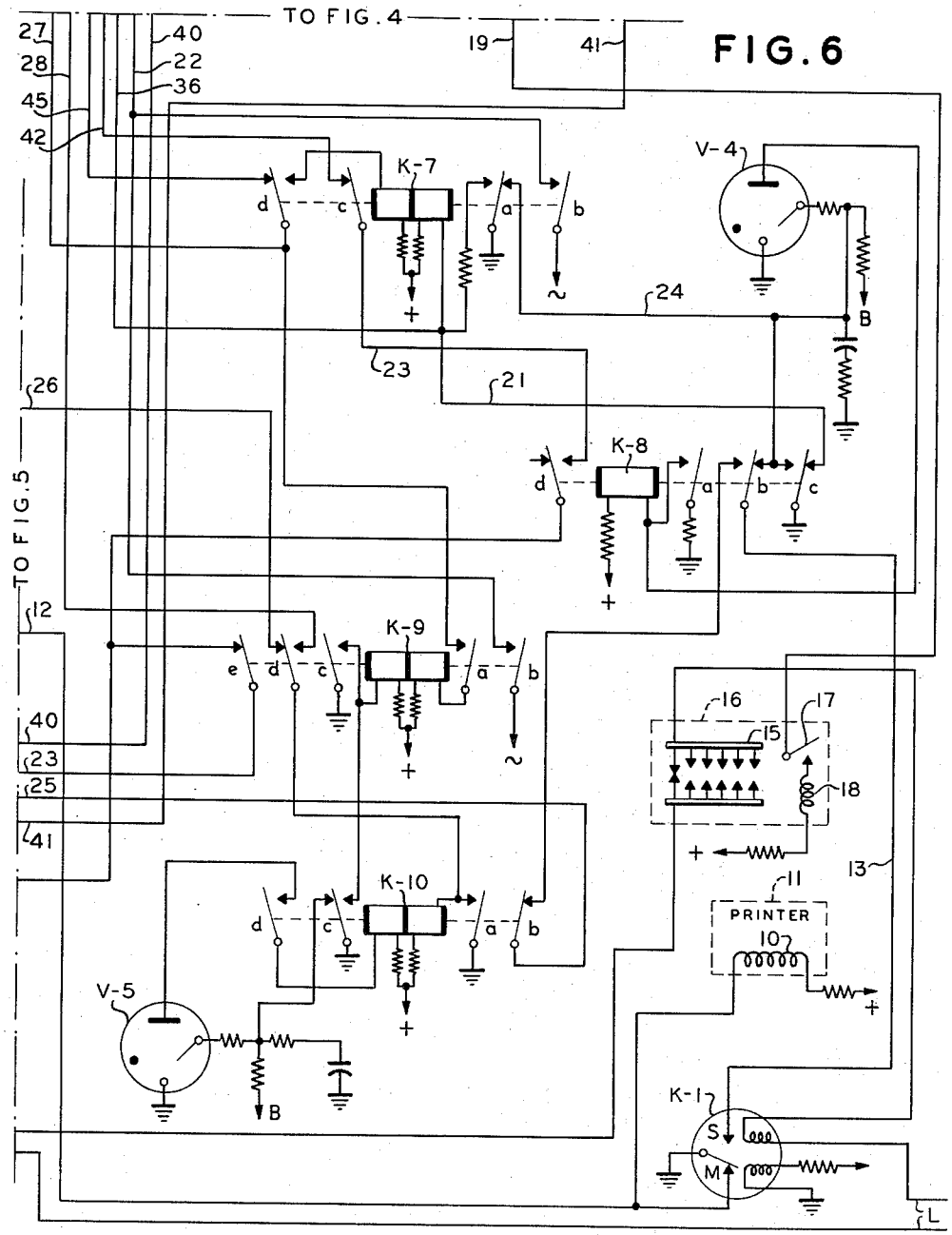

Referring first to FIG. 1, a half duplex system is shown comprising a central station and a plurality of way stations, it being assumed in the present embodiment that six such way stations are included in the line circuit.

The equipment at the central office includes a receiving relay K–21 arranged to operate a recorder RC–2 from its marking contact M and having control mechanism associated with its spacing contact S. For simplicity the relay K–21 is shown operated from a line relay LR differentially connected to the real line L and artificial line AL, although it is to be understood that in actual practice a half-duplex carrier circuit is normally employed. The central office is also provided with a plurality of serially connected number transmitters, such as Txr. 1, one for each way station, as will later appear, a text transmitter Txr. A, and a transmitting relay TR. Battery at the tongue of TR is applied through the make contact of relay TR, the rings of a distributor E–2 or contacts disposed in shunt thereto, and thence differentially to the relay line L and artificial line AL. The line L, at each way station, is shown connected serially through line contacts, represented by C–6, the contacts of a transmitter 15 and the winding of a line relay K–1, and terminates at ground at the last way station. At each way station the selecting magnet of a receiving printer 11 is connected from grounded battery through the marking contact of relay K–1 to the grounded armature of the relay. An auxiliary ground is also normally applied to the printer magnet by grounding contacts, represented by C–1, so that the printer will not follow the line relay K–1. A clutch magnet 18 is also provided at each way station to effect the operation of the transmitter 15. This magnet is controlled by normally open contacts such as C–2. The manner of selecting a way station for transmission is by closing of clutch contacts C–2 at such station and the manner of selecting the station for reception of a message from the main station is by opening of the printer grounding contact C–1. In a somewhat similar manner, at the central office the magnet of printer RC–2 is normally grounded by contacts such as C–3 and the operating circuits of the clutch magnets CM–1 and CM–A of the numbering machine and text transmitter Txr. 1 and Txr. A are open at contacts C–4 and C–5.

Referring again to the way station, a request button RB is provided at each such station, which the operator may depress whenever he has tape in the transmitter awaiting transmission. The button RB, operating through a group of control relays and timing devices CR–1 serves to open the line contact C–6 to send a short open (40 milliseconds) to the central office. This is known as a request signal and causes the central office equipment to send out an invitation cycle composed of a series of signal sequences, designated as invitation sequences, which invite each of the way stations, in turn, to transmit. This request signal busies the control equipment of each of the way stations and at the central office acts through line relay K–21, a group to control relays CR–2, an invitation relay K–25, and a pulse distributor E–2 to set an invitation rotary switch RS–1 into operation. The switch RS–1 serves to selectively short the transmitting rings of the distributor E–2, and to control a group of dwell relays DR for transmitting a series of invitation sequences to the way stations, to thus allow each of the way stations to transmit in turn. On the first invitation sequence should station No. 1 accept the invitation and transmit its message, the following invitation sequence will omit an invitation to station No. 1 and will first invite station No. 2. If station No. 2 has nothing to transmit, then station No. 3 will be invited in the same sequence. If station No. 3 accepts the succeeding sequence will start with station No. 4. Sufficient invitation sequences are transmitted to give each station an opportunity to transmit. A second rotary switch RS–2 at the central office maintains this sequential order of invitation by determining, in each sequence, the first station to which an invitation cycle will be transmitted. Each of the invitation sequences consists of a uniform number of open line conditions which are received on the line relays K-1 at each station and serve to operate gating relays GR at each station. The gating relays in turn gate the succeeding pulses to a rotary switch RSS which steps through a complete cycle in making a station acceptance. The invitation signals each include a long dwell or closed line condition following one of such stepping pulses and serve through the control relays CR-1 and associated timing devices of a station, upon accepting the invitation, to open the line contacts C-6 to transmit an open condition answer-back signal to the central office. The central office, in response to the answer-back signal conditions the printer ground at C-3 to be opened at the end of its invitation sequence to place the printer under control of the line relay K-21 and also conditions the control relays CR-2 to send no further invitation dwells in that invitation sequence but to send stepping pulses only so as to step each rotary switch RSS to its home position. Shortly after the switch RSS reaches its home position the clutch contacts C-2 at the station accepting the invitation, are closed to start the transmitter 15 into operation. It is assumed that the way stations operate on a torn tape basis and when transmission is completed by tape running out of the transmitter 15, tape contacts 17 open to interrupt the transmitter clutch magnet circuit. A short interval thereafter, the next invitation sequence is transmitted from the central station and repeated until each station has been invited. The invitation cycle ends with a sequence in which none of the way stations accept the invitation. The function of this last sequence is to restore the way station sets to normal.

If no request signals is sent out by any of the way stations for a prolonged period of time, the central office may initiate an invitation cycle. This is effected by a timer E-1 at the central office, which operates periodically through the control relays CR-2, to activate relay K-25 to initiate such an invitation cycle.

Should the central office have a message to transmit to any way station it may, by operation of a station selection key, such as S-1, S-2, effect through the control relays CR-2, the operation of selecting relay K-31, which in turn initiates operation of a stepping switch RS-3 to transmit a station selection cycle over the line. This cycle will comprise a station selecting sequence and a station cut-out sequence. The station selection sequence contains the same number of spacing pulses as each invitation sequence but includes a long dwell which only follows the stepping pulse corresponding to the station to be selected. The selected station responds during this dwell with an answer-back open line condition which conditions the control relays CR-2 at the central station, so that at the end of the selecting sequence contacts C-4 will be closed to energize the clutch magnet CM-1 to start the number transmitter Txr. 1 and after it has completed its cycle, contacts C-5 will be closed to energize the clutch magnet CM-A of the text transmitter Txr. A. The selection signal at the selected station also acts to open the printer ground at contacts C-1 to enable the printer at the selected station to respond to the received signals.

At the end of the transmission from the central office stepping switch RS-3 resumes its movement to send the station cut-out sequence over the line to restore all of the way station sets to normal.

It is to be understood that the disclosure of FIG. 1 is fragmentary and highly schematic and that contacts such as C-1 to C-6 may consist of a number of serial or parallel arranged relay contacts. The exact nature of the invitation, selecting and cut-out signal sequences is shown in FIGS. 7A to 7E and these signal sequences will be fully described in connection with the detailed description of the way station circuits of FIGS. 3 to 6 and the central office circuits of FIGS. 8 to 16 which follows.

The detail circuits for the control unit at one of the way stations, station No. 2 having been selected by way of example, are shown in FIGS. 3 to 6. Referring now to these figures, the line circuit L (FIG. 6) terminates in the operating winding of the line relay K-1 and under idle conditions this circuit is held marking so that the grounded armature of relay K-1 is against its marking contact M. This contact is connected directly through the selector magnet 10 of the receiving printer 11 to battery but the printer is normally held non-responsive to the line relay by a steady ground applied thereto over the conductor 12, as will hereinafter appear.

The spacing contact S of the line relay is connected to a circuit 13, the function of which is to control, through the receipt of spacing pulses by the relay, the operation of the station selector, either for reception of a message from the central or relay office or the transmission of a message to the central office.

The line circuit L is connected from the winding of relay K-1 through the transmitter sending contacts 15 and left armatures and break contacts of relays K-3 and K-4, in parallel.

The selection of a way station from the central station is effected through an 11-point 3-level rotary selecting switch RSS (FIG. 3) in which the wiring of levels I and II is identical at all stations, level III being individually coded for each way station. The station selecting points of level III are numbered 4 to 9, all but one of which are strapped together, the unstrapped point being individual to each station. In way station 2, of the present example, point 5 is unstrapped and is connected to the tongue $a$ of relay K-13 from which it is extended, as will be hereinafter described, to effect the desired station selection. The rotary switch has a stepping magnet K-5 actuated, as will hereinafter appear, by spacing operations of the line relay K-1 under control of a pair of gating relays K-14 and K-15 (FIG. 5).

When tape to be transmitted from station 2 is placed in the transmitter 16, tape contacts 17 are closed from battery in series with the transmitter clutch magnet 18, conductor 19, winding of tape awaiting relay K-2 and thence by conductor 20, and tongue $b$ and break contact of relay K-13 to ground. The current in this circuit is sufficient to operate relay K-2 but is not sufficient to operate the clutch magnet 18.

Relay K-2, when operated, applies battery through tongue $b$ and back contact of relay K-11 and the winding of relay K-20 to the request button RB, the opposite contact of which is grounded.

Assuming power to be on the system relay K-4 will normally be operated through the break contact and tongue $a$ of relay K-3. The application of power also cause relay K-7 to operate from battery through its right-hand writing, over conductor 21 and back contact and tongue $c$ of relay K-3 to ground. Relay K-7 then locks up to ground at its armature $a$ and causes busy lamp BL to light over a circuit from ground, lamp BL, conductor 22, make contact and tongue $b$ of relay K-7 to A.C. power. Relay K-7 also opens at its tongue $C$ a request circuit 23, later to be described, which controls the transmission of a request to send signals over the line. It also cause operation of relay K-8 as follows: The winding of K-8 is connected from battery through timing tube V-4 to ground. The starting grid of V-4 is connected by armature $b$ of relay K-8 and conductor 13 to the spacing contact S of line relay K-1, which contact, however, is open at this time. The grid is also connected by conductor 24 to ground at back contact and armature $a$ of relay K-7. Upon operation of relay K-7 this ground is removed from the grid of tube V-4 whereupon the starter anode potential rises under control of the timing condenser and, after an interval of say 3 seconds, tube V-4 fires and relay K-8 operates, locking at tongue *a* and extinguishing the arc in V-4 by the ground applied at this tongue. Ground is also reapplied to the starting electrodes at tongue C. Relay K-8 at tongue *d* closes a previous open in the request circuit 23, referred to above. Relay K-8 also completes a circuit from the open spacing contact S of the line relay K-1 to the gating relay K-15 over conductor 13, tongue *b* and front contact of K-8, back contact and tongue *b* of relay K-10 and conductor 25 to tongue *b* and back contact of relay K-15 and thence to the left or operating winding of relay K-14, to power.

During this time the marking contact M of line relay K-1 is grounded (1) over circuit 12 at the tongue *c* of relay K-12; (2) at tongue *c* of relay 15, and (3) at tongue *b* of relay K-14. As a result no spurious characters may reach the printer 11. Moreover, the clutch magnet 18 of the transmitting-distributor is not energized so that the transmitter can not be operated.

All spacing intervals occurring during normal transmitter-distributor operation and all transmitted station selection or control sequence pulses are substantially less than 3 seconds in duration so that any signals received on the line relay K-1 during the 3 second timing interval of tube V-4 would apply ground to the starting anode, at the spacing contact of K-1 and thus delay operation of relay K-8 until 3 seconds after the arrival of the last space pulse, thus insuring that any control sequence from the central office will have been completed before K-8 operates to condition relays K-14 and K-15 to respond to it. This prevents the stepping switch RSS from being stepped by a part only of an incomplete control cycle.

Let it be assumed that tape has been inserted in the transmitter 16 and that message waiting relay K-2 is operated in response thereto. If the attendant now depresses the request button RB a circuit is completed to operate the request relay K-20 from ground at the button to battery at the tongue of relay K-2. Relay K-20 locks through its armature *a* and operates the request lamp RL through its armature *b*.

Thus, with relays K-2, K-4, K-7, K-8 and K-20 operated no further action can occur at the tributary station until an invitation sequence is received from the central office. Eventually such an invitation sequence will be received. The transmission of this sequence will be fully described hereinafter with reference FIGS. 8 to 11. For an understanding of the operation of the tributary station control unit, reference is made to FIG. 7A which illustrates the nature of an invitation control sequence effective to select station 2. As will be noted this sequence consists of a busy character (sequence interval *a*) comprising the code character M having the rest and first two pulses spacing and the last three pulses marking, followed by a two second marking interval or dwell (sequence interval *b*), an activating character (interval *c*) which again corresponds to the code character M, followed by two blank or all marking characters or dwells (interval *d*); two M characters (intervals *e* and *f*), to produce two stepping pulses, a two character dwell (interval *g*), two M characters (intervals *h* and *i*) to produce two more stepping pulses, a second two second dwell (interval *j*), another M character (interval *k*) to produce another stepping pulse, a third two second dwell (interval 1) and a group of six M characters (intervals *m* to *r*) to produce a group of six stepping pulses.

When the first activating or busying character comprising sequence interval *a* is received, the line relay K-1 goes to its spacing contact, thus applying ground through armature *b* of operated relay K-8, armature *b* of unoperated relay K-10, conductor 25, and armature *b* of unoperated relay K-15, to the left winding of relay K-14, thereby to operate this relay at all tributary stations. At tongue *b* relay K-14 applies ground over a circuit including the conductor 26, back contact and tongue *d* of relay K-9, and thence through the right winding of relay K-10, which operates and locks at its tongue *a* and sets up its own delayed release circuit by removal of ground at tongue *c* from the grid of timing tube V-5, the anode circuit of which is connected to battery through made armature and the left winding of relay K-10 in opposition to its right hand winding.

Relay K-10, at its tongue *b* disconnects the grounded space contact of line relay K-1 from relay K-14, causing relay K-15 to operate by current flow through the left winding of K-14, its tongue *c*, and right winding of relay K-15, to ground at tongue *e* of relay K-14, whereby these relays lock together.

Relay K-9 is also operated through its left winding to ground at tongue *c* of relay K-10. It thereupon (1) locks up at its tongue *c* and (2) operates busy lamp BL (if not already operated by relay K-7) over a circuit shunting tongue *b* and make contact of relay K-7 and including tongue *b* and make contact of relay K-9. Relay K-9 also (3) sets up its own knock-down circuit from its right winding and tongue *a* and conductor 27 to point 10 of level III of the rotary switch RSS and (4) transfers, at tongue *d*, operative control of relay K-10 from tongue *b* of relay K-14 to conductor 28 and the strapped points 4 to 9 of level II of the rotary switch. In addition relay K-9 (5) at its armature *e* opens the request circuit 23 at each tributary station, so as to prevent any request to send being made by any of the other tributary stations, as will more fully appear hereinafter.

Early in the two second dwell (sequence interval *b*) following the busying pulse, relay K-14 and K-15 are knocked down as described below and towards the end of this dwell relay K-10 is knocked down by firing of its timing tube V-5. Relay K-9, however, remains operated. Relay K-14 is released by timing tube V-1, the anode of which is connected through armature *a* and the right winding of the relay in opposition to the left winding, the normal ground of the starting anode of V-1 being lifted at tongue *f* of relay K-14 and tongue *g* of relay K-15, when both relays are operated. Following release of relay K-14 relay K-15 is released by removal of ground from the starting electrode of the timing tube V-6 at armature *f* and make contact of relay K-14. When tube V-6 fires a circuit is completed from battery at break contact and tongue *e* of relay K-14, right winding of relay K-15, in opposition to its left holding winding, make contact and tongue *a* of K-15, conductor 29, tongue *c* and break contact of relay K-19 and conductor 30, to the anode of tube V-6, the cathode of which is grounded.

Thus with relays K-10, K-14 and K-15 released during interval *b*, the second space pulse or activating character (sequence interval *c*) again operates relays K-14 as before, relay K-10 however remaining unoperated since its control was transferred from relay K-14 to the rotary switch RSS; but at the end of this spacing pulse, when ground is removed by the line relay K-1 from the outer terminal of the left hand winding of relay K-14, the current through this winding is again extended through the right winding of relay K-15 to operate the same and causing it to lock-up with relay K-14 as before.

During the following dwell (interval *d*) the tube V-1 operates to again release relay K-14. This two character length dwell, which at normal signaling speeds is about 0.4 seconds in duration, is not sufficient for tube V-6 to fire following the release of relay K-14 and therefore K-15 remains energized. With relay K-14 released and K-15 operated a circuit is extended from spacing contact S of line relay K-1 over conductor 13, tongue *b* and make contact of relay K-8, back contact and tongue *b* of relay K-10, conductor 25, tongue *b* and make contact of K-15, armature *d* and back contact of relay K-14, conductor 31, through the winding of a relay K-18 and thence to the stepping magnet K-5 of switch RSS to battery. The stepping magnet K-5 is designed to step on release. Relay K-18 is slow-to-release, holding for 200 or more milliseconds after its circuit is opened. An associated relay K-16 is operated and released directly in response to the operation and release of relay K-18 but is slow to the extent that its release follows that of relay K-18 by about 40 milliseconds.

Now, with relay K-14 released and relay K-15 operated, upon the reception of the spacing pulse (interval e of the control sequence), ground is applied over the circuit last traced to energize the slow-to-release relay K-18 and step magnet K-5, relay K-16 operating from the contacts of K-18. The following marking pulse of interval e releases the step magnet K-5 which steps its wiper from the 11th or home position shown to its point 1. Since this marking pulse is only about 100 milliseconds in length, relay K-18, with its 200 millisecond release period, holds operated.

At level 1 of the rotary switch the wiper W-1 applies ground by conductor 32 to the winding of relay K-19, which operates and locks through its tongue a, and conductor 33 to ground at tongue g of relay K-15. Relay K-19 prevents release of K-15 (which is locked through its armature f) by applying ground at armature b and conductor 34 to the starting anode of timing tube V-6 and, at armature c, removing the anode of tube V-6 from connection with the right winding of K-15.

No connections are established at levels II or III of the rotary switch on this first step. The next spacing pulse (sequence interval f) steps the switch RSS to point 2 and the long dwell which follows (interval g) permits relays K-18 to release and relay K-16 to release 40 milliseconds later. During this 40 millisecond interval ground is applied from armature b of released relay K-18, and armature b of operated relay K-16 to the wiper of level III of switch RSS, and thence from point 2 thereof over conductor 35, armature a and back contact of relay K-11 and conductor 36 to the right winding of relay K-7, to operate this relay, if not already operated.

The next two space pulses (sequence intervals h and i) step the rotary switch to point 4, and the two second dwell (interval j) again connects ground to wiper III for 40 milliseconds. This point 4 is the identifying point on the rotary switch for tributary station No. 1 and if this station has nothing to transmit no action results.

The next space pulse (interval k) and the following dwell steps the switch to point 5 this being the identifying point for station No. 2, which it has been assumed has tape in its transmitter 15 and has had its request button RB depressed to operate relay K-20. When ground is now applied to wiper III during the 40 millisecond interval following release of relay K-18, this ground is applied from point 5, at station No. 2, through tongue a and back contact of relay K-13, conductor 37, make contact and tongue c of relay K-20 to the left winding of station selection relay K-11, causing this relay to operate and lock-up at armature f.

Operation of relay K-11 (1) lights the send lamp SL from ground at the lamp and tongue e of relay K-11 to A.C. power. It also (2) releases relay K-20 at its tongue b thus extinguishing the request lamp RL, and (3) prepares its own knockdown circuit through timing tube V-3 by applying ground to the cathode of the tube through its tongue c and make contact, and tongue d and break contact of relay K-6, thus conditioning V-3 to operate after a 20 second delay. In addition relay K-11 (4) closes ground to the cathode of timing tube V-7 over conductor 38, tongue e and rear contact of relay K-13, and thence by conductor 39 through the make contact and tongue g of relay K-11 to ground; (5) extends an operating circuit for relay K-6 from battery at the tongue of relay K-2, tongue b and make contact of relay K-11 to the winding of relay K-6 and to the anode of timing tube V-2, the cathode of which is connected through armature d and make contact of relay K-11, conductor 40, armature e and make contact of relay K-15 and thence by conductor 41 to B battery at the starting electrode of timing tube V-2. This tube fires shortly after the rotary switch moves to its home position to operate relay K-6 as will later appear.

The above mentioned application of ground to tube V-7 causes this tube to fire in the early portion of the two second dwell (interval L) thereby operating relay K-3, connected in the tube circuit. K-3 opens the line circuit L at armature c and the circuit of relay K-4 at armature a. Relay K-4, as stated, is timed to release 40 milliseconds later, thus again closing the line circuit at its armature. The 40 millisecond open is thus sent to the line and serves as an answer-back to the central office that a message is to be picked up at tributary station No. 2. This answer back signal (indicated in dotted line in FIG. 7A, interval L) actuates means at the central station, as will be fully described hereinafter, to alter the invitation sequence being transmitted by omitting all further two second dwells after the stepping pulses so that the following intervals m to r comprise stepping pulses only.

During the foregoing movement of switch RSS, upon the stepping of this switch to its fourth point and during the 40 millisecond release period of relay K-16 following release of relay K-18, a pulse is sent from ground at relay K-18 through armature a of relay K-16, wiper W-2 of level II and point 4 thereof, conductor 28, make contact and tongue d of relay K-9, to the operating winding of relay K-10, causing this relay to operate and at its tongue b to interrupt the circuit to the spacing contact of line relay K-1. The purpose of this is to disconnect the line relay from the stepping magnet of switch RSS at each way station during the 40 millisecond answer-back signal which would have been sent over the line had station 1 been selected and thus prevent false stepping of the rotary switch. Relay K-10 is self-timing as previously described and releases prior to the next stepping pulse (interval k) and operates again for a similar purpose during the following dwell (interval L) when station No. 2 is selected and transmits its 40 millisecond answer-back signal. About the middle of this dwell relay K-10 again releases.

Following dwell L the central office, as stated, transmits a series of stepping pulses without intermediate dwells. Since relay K-18 does not release between such pulses no further circuits are completed through the rotary switch until the brushes reach point 11 whereupon wiper W-1 connects ground through made tongue c of relay K-19, conductor 29, made tongue a of relay K-15, its right winding in opposition to the left winding thereof and to battery at tongue e and back contact of relay K-14. Consequently relay K-15 falls down and interrupts the locking circuit of relay K-19 so that it releases. Relay K-15 connects ground to the cathode of timing tube V-2 from back contact and armature e of this relay, conductor 40, and made armature d of relay K-11. A short period later tube V-2 fires causing relay K-6 to operate and lock at its tongue a. The operation of relay K-6 shunts relay K-2 over made tongue c of K-6 without, however, releasing relay K-2, and thus allows current to rise in the transmitter-distributor clutch magnet 18 to a level sufficient to start the transmitter and cause the message in its tape to be transmitted. The first character sent will activate the receiving relay K-1 to spacing at all tributary stations to operate relays K-14 and K-15. Since no long dwells occur during normal tape transmission, relays K-14 and K-15 remain operated until the end of the message. With both of these gating relays operated the rotary switch stepping circuit is held open so that false stepping of the switch cannot occur.

At the completion of the message, as the tape runs out of the transmitter, contact 17 opens, releasing relay K-2 and thus releasing relay K-6.

During transmission from station No. 2, the intermittent ground applied to the starting electrode of tube V-1 at the spacing contact S of relay K-1 prevents this tube from firing. However, a fraction of a second after the tape runs out, tube V-1 will fire to knock down relay K-14. This applies battery from tongue *e* of relay K-14, through the right winding of relay K-15, its tongue *a*, conductor 29, tongue *c* and back contact of relay K-19, and conductor 30, to the anode of tube V-6, and also removes ground from the starting electrode of tube V-6 at tongue *f* of relay K-14. Shortly thereafter tube V-6 conducts and knocks down relay K-15. The release of relay K-6 applied ground to the cathode of the 20 second delay tube V-3 at armature *d* and back contact of relay K-6, and made tongue *c* of relay K-11 and therefore tube V-3 fires 20 seconds after the end of the message, knocking down relay K-11 through its opposed right winding.

Relay K-11 on its release opens, at its tongue *g* the initiate circuit of the answer-back signal, including the conductors 38, 39 and tube V-7 so that relay K-3 releases. Relay K-4 is then reoperated from tongue *a* of relay K-3 so that the sending loop 14 is held closed by one or the other of these relays at all times. The circuits at all tributary stations are now returned to normal idle condition with relays K-4, K-7 and K-8 operated.

Within a prescribed period after the end of the message the central office will start another invitation sequence similar to the one described except that no dwells will be inserted after the fourth and fifth stepping pulses (stations Nos. 1 and 2 selections) so that the first station which may respond will be station No. 3 and if this or any higher numbered station have requests waiting the message is accepted from the next higher numbered station. Thereafter new inviting sequences will be transmitted until all stations have had an opportunity to transmit.

Station No. 6 is the last station afforded an opportunity to transmit. If this station accepts the invitation, transmission will proceed therefrom in the same manner as described with reference to station No. 2. Following this transmission the central office will transmit a final signal sequence, of the form shown in FIG. 7B, in which no invitation dwells are included but in which a two second dwell is inserted at the end of the tenth step pulse, the purpose of which is to restore the tributary station relays to their normal condition. However, if station No. 6 fails to respond during the invitation dwell provided for it after the ninth step pulse, then the absence of an answer-back or acceptance signal during such invitation dwell period will be sensed at the central office and the station normalizing two second dwells will be inserted after the next or tenth step pulse of this same signal sequence. This dwell will occur with all of the rotary switches on point 10 and during this dwell a 40 millisecond pulse will be sent from ground at relay K-18, wiper W-3 and point 10 of level III, conductor 27 and tongue *d* and make contact of relay K-7 to the left or opposing winding thereof, thereby knocking down all relays K-7. A parallel circuit, through tongue *a* and right winding of relay K-9, also releases relay K-9 at each station. The final stepping pulse steps the rotary switch to its home or point 11 position. In the dwell following the eleventh stepping pulse ground from wiper W-1 and point 11 of level I causes relays K-15 and K-19 to be released at all stations, as previously described, to restore all station sets to the normal idle status with relays K-4 and K-8 only operated.

It will be remembered when power was first applied to the station sets, that relays K-4, K-7 and K-8 were operated and that transmission from station No. 2, for example, could only result in response to an invitation sequence from the central office. However, after the final sequence, with relay K-7 released, it is possible for any station to transmit a request to transmit to the central office. Thus with tape in the transmitter and relay K-2 operated as a consequence thereof, the depression of request button RB operates relay K-20 as before described. With relay K-7 now released a ground for the cathode of timing tube V-7 is applied by a circuit extending from the cathode, over conductor 38, tongue *e* and back contact of relay K-13, conductor 39, make contact and tongue *d* of relay K-20, conductor 42, back contact and tongue *c* of relay K-7, make contact and tongue *d* of relay K-8, back contact and tongue *e* of relay K-9, conductor 23, back contact and tongue *d* of relay K-15, conductor 43 and back contact and tongue *b* of relay K-12 to ground. Thus tube V-7 fires and operates relay K-3, opening the sending circuit, and 40 milliseconds thereafter relay K-4 operates to reclose the sending circuit. This 40 millisecond open serves the same purpose at all other tributary stations as the busy signal (interval *a* of FIG. 7A) previously discussed. The response of the central office to this request signal is, following a two second dwell, to transmit an activating character followed by the 11 stepping pulses and appropriate dwells to effect a selection of the station making the request. The manner in which the central office reacts in response to this request will be described with reference to FIGS. 8 to 16.

It will be noted then that the selecting equipment at each tributary station will respond to invitation signals either sent periodically by the central office or sent in response to a request transmitted by the tributary office. In addition the station sets may be selected by the central office for the reception of messages from the central office. This selection of a particular tributary station will now be described.

Figure 7:
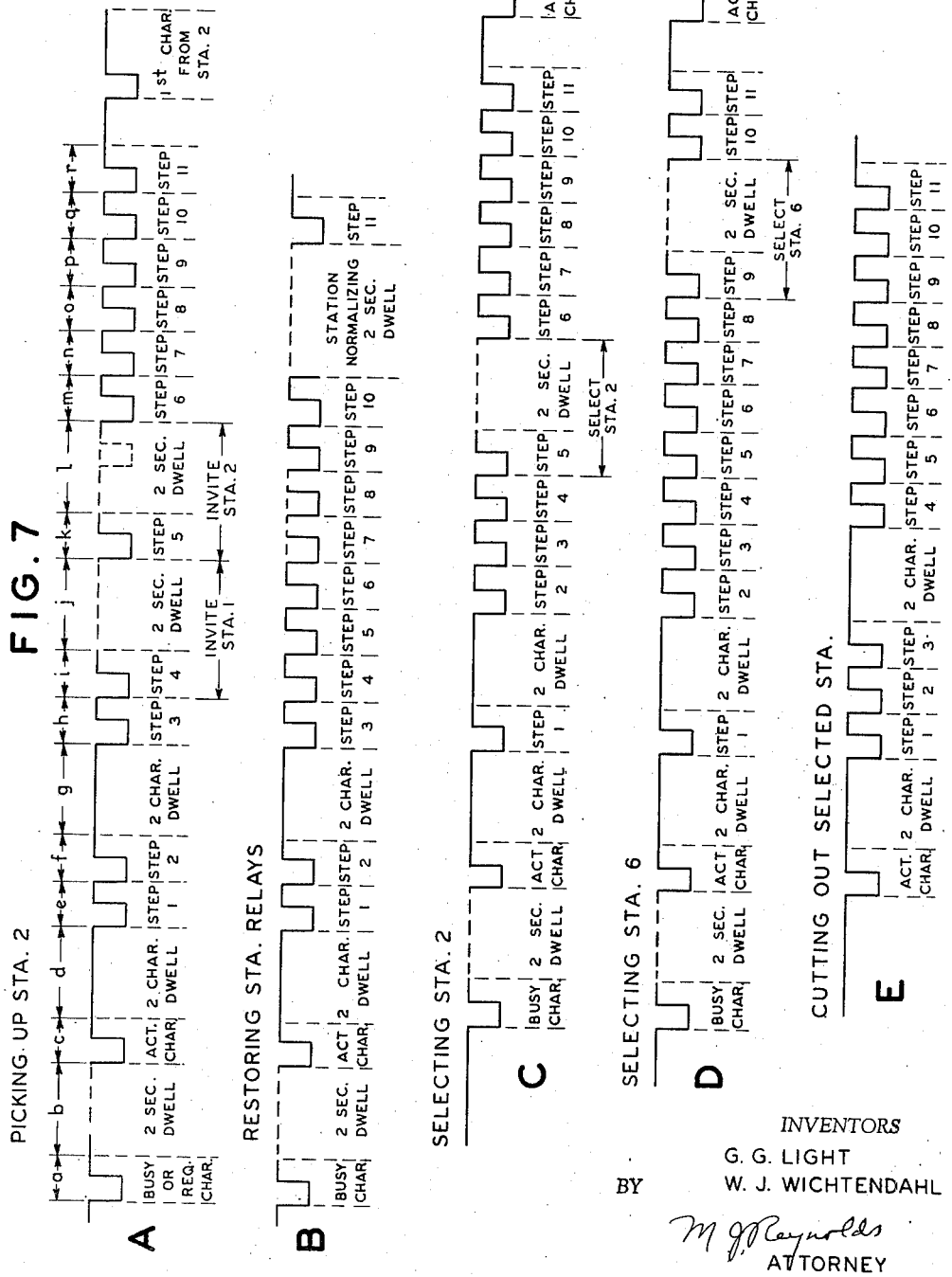
FIGS. 7A to 7E show the nature and arrangement of the control signals utilized for selecting a way station for reception of a message or inviting a way station to transmit a message.

Assuming the central office has a message to transmit to tributary station No. 2, it will first send a selection sequence of the form shown in FIG. 7C. FIG. 7D shows the the sequence which would serve to select station No. 6. At the time the selecting signals (FIG. 7C) are transmitted by the central office it is to be remembered that relays K-4 and K-8 will be operated at the tributary stations.

In response to the first spacing or busying character the line relay K-1 applies ground through previously described contacts of relays K-8, K-10 and K-15 to operate relay K-14. The latter operates relay K-10, which sets up its own knockdown circuit through tube V-5, operates K-9 and opens the circuit extending from the spacing contact of line relay K-1, thus effecting operation of relay K-14, all as previously described with reference to the busying pulse of an invitation sequence. Relay K-9 opens the circuit of request control tube V-7 so that no request may be transmitted from any of the tributary stations during the remainder of the selecting sequence. During the two second dwell following the busying impulse tube V-1 under control of the operation of relay K-15 fires and knocks down relay K-14 which in turn activates tube V-6 to knock down relay K-15. Relay K-10 also releases under control of its timing tube V-5, leaving at the end of the first two second dwell relays K-4, K-8 and K-9 in operated condition.

The activating character again operates relays K-14 and K-15. Relay K-10 does not operate in this cycle since its circuit is made through the back contact of now operated relay K-9. During the following two character dwell K-14 is again knocked down by its timing tube but relay K-15 remains operated due to the shortened period of this dwell (approximately 0.4 second). Thus at the end of the dwell following the activating pulse relays K-4, K-8, K-9 and K-15 are operated and the spacing contact of the line relay is extended through contacts of relays K-10, K-8, K-14 and K-15 to the winding of relay K-18 and stepping magnet K-5.

The next pulse (1st step pulse) operates relay K-18 which operates relay K-16, as before described, and at the end of the pulse the rotary switch steps from point 11 to point 1. At level I point 1, the wiper W-1 grounds relay K-19 which on operating holds gating relays K-14 and K-15 in their respective unoperated and operated conditions. During the following two character dwell a 40 millisecond ground is applied by relays K-18 and K-16 over wiper W-3 and point 1 of level III to operate relay K-13, which locks through its *d* tongue and conductor 33 to ground at tongue *g* of relay K-15. Relay K-13 at its tongue *a* transfers the station selecting point of the rotary switch (point 5 of level III for station No. 2) from winding of relay K-11 to winding of relay K-12.

If station No. 2 is being selected, four more stepping pulses are transmitted (FIG. 7C) without intermediate dwells. Rotary switch RSS is thus stepped to its point 5 while relays K-18 and K-16 remain operated. Thus as the rotary switch crosses point 4 there will be no pulse generated at these relays to effect a selection of station 1. After the fourth pulse (step 5) of this successive group is received, it is followed by a two second dwell, allowing relay K-18 to release, 40 milliseconds prior to release of relay K-16, and thus apply ground to wiper W-2 of level II and wiper W-3 of level III. From level II this ground operates relay K-10 to open the circuit to the spacing contact S of the line relay for the timing period of knockdown tube V-5. From level III the ground is extended through point 5 and made tongue *a* of relay K-13 to operate station selection relay K-12.

Relay K-12 (1) operates the signal buzzer SB over a circuit from ground at the buzzer, conductor 44, tongue *a* and back contact of relay K-17, and tongue *d* and made contact of relay K-12 to A.C. power; (2) one of the grounds (at tongue *c* of relay K-12) is removed from conductor 12 connected to the printer magnet 10; and (3) ground is connected to the cathode of timing tube V-7, over conductor 38, tongue *e* and front contact of relay K-13, and front contact and tongue *b* of relay K-12. Shortly thereafter tube V-7 conducts and its associated relay K-3 operates, followed about 40 milliseconds later by release of relay K-4, thus sending a 40 millisecond space signal to line. Due to the operation of relay K-10 at all stations at this time, this open, which appears at the line relays at each station, is not repeated to the stepping magnet K-5 at any of the tributary stations and is effectively received only at the central office. A manual switch BR serves to operate relay K-17 to interrupt the buzzer circuit. Relay K-17 locks at tongue *e* of relay K-12 until the selected station is cut out following the message transmission, as will later appear.

This answer-back is read at the central office and at the end of the dwell additional stepping pulses, without dwells (FIG. 7C), are sent to step the rotary switches to their home position 11. A short dwell is sent at the end of the last stepping pulse (step 11) during which ground from wiper W-1, level I, point 11, is extended through make contact and armature *c* of relay K-19, conductor 29, and tongue *a* of relay K-15 to the right winding thereof, to knock this relay down, and in turn to release relays K-19 and K-13. Relay K-13 removes ground from the cathode of tube V-7, thus breaking the circuit to relay K-3 whereupon relay K-4 again operates. Relays K-18 and K-16 fall by lapse of time. The selecting sequence is then ended by a final activating pulse transmitted by the central office. This pulse reoperates relays K-14 and K-15, thus removing all ground from the printer magnet at the way station, other than that applied by the tongue of the line relay K-1. The central office now transmits, relays K-14 and K-15 being held operated through the transmission period by the intermittent ground applied to the starting electrode of tube V-1 by the spacing contact of the line relay, which thus prevents tube V-1 from firing to release relay K-14.

At the end of the message relay K-1 goes to marking, thus permitting tube V-1 to fire to release relay K-14, and shortly thereafter tube V-6 fires to release relay K-15. Station selection relay K-12, however, remains operated.

Unless sooner initiated by a manual switch at the central office, approximately 30 seconds after the end of the message the central office sends out a sequence for cutting out the selected station. This sequence is of the form shown in FIG. 7E. The actuating character operates the relays K-14 and K-15, as before and in the following short dwell relay K-14 is released while relay K-15 remains operated. The following three stepping pulses move the rotary switch over point 1 to reoperate relay K-19, as previously described and on to point 3 and the dwell following step 3 sends ground from contacts of relays K-18 and K-16, through wiper W-2 of level II, point 3, and tongue *f* and make contact of relay K-12, to the opposing winding, thus knocking down relay K-12. This reapplies ground to the printer magnet so that it will not follow the line relay. A similar ground is applied from relay K-18 to wiper W-3 and point 3, at level III, and this ground is extended by conductor 45 through back contact and tongue *d* of relay K-7 and made tongue *a* of relay K-9 to the right or opposing winding of this relay, thus knocking down relay K-9 and extinguishing the busy light. Eight additional stepping pulses are then received to step switch RSS to its home position 11 and the short dwell that follows allows relays K-15 and K-19 to be released, restoring all relays except relays K-4 and K-8 to their normally idle condition.

During the selection of station No. 2 it will be recalled that the rotary switch dwelled on point 5 to apply a ground at level III to operate relay K-12. At all other tributary stations point 5 of level III is strapped to tongue *c* of relay K-13 which extends this ground to tongue *f* of relay K-12. Consequently had relay K-12 at any other station been operated for any reason, this ground through its right or opposing winding would have knocked the relay down, thus insuring that relay K-12 is operated only at the selected station.

Central office set

Figure 8:
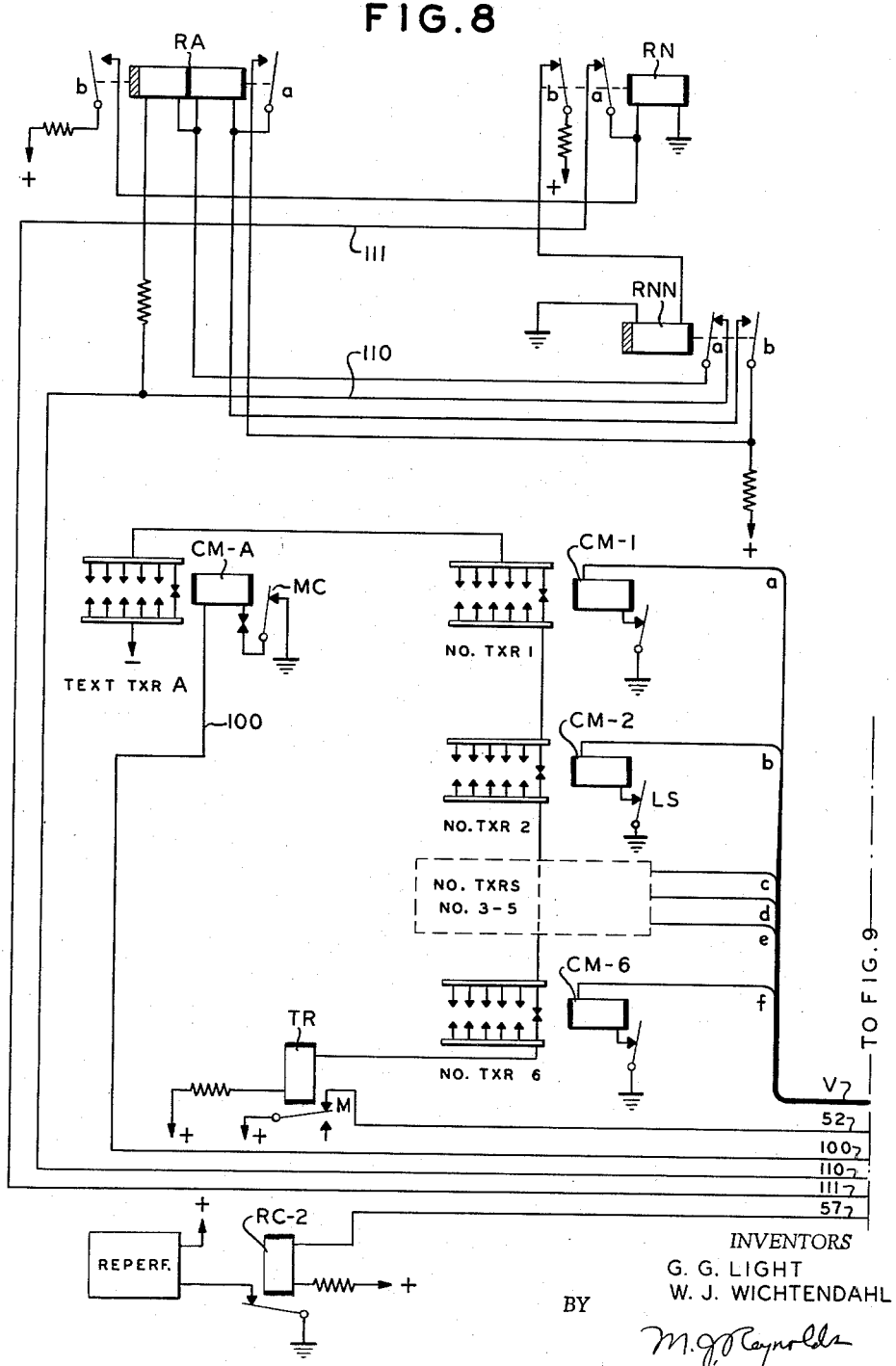
FIGS. 8 to 16 illustrate the central-office equipment and circuitry.
Figure 9:
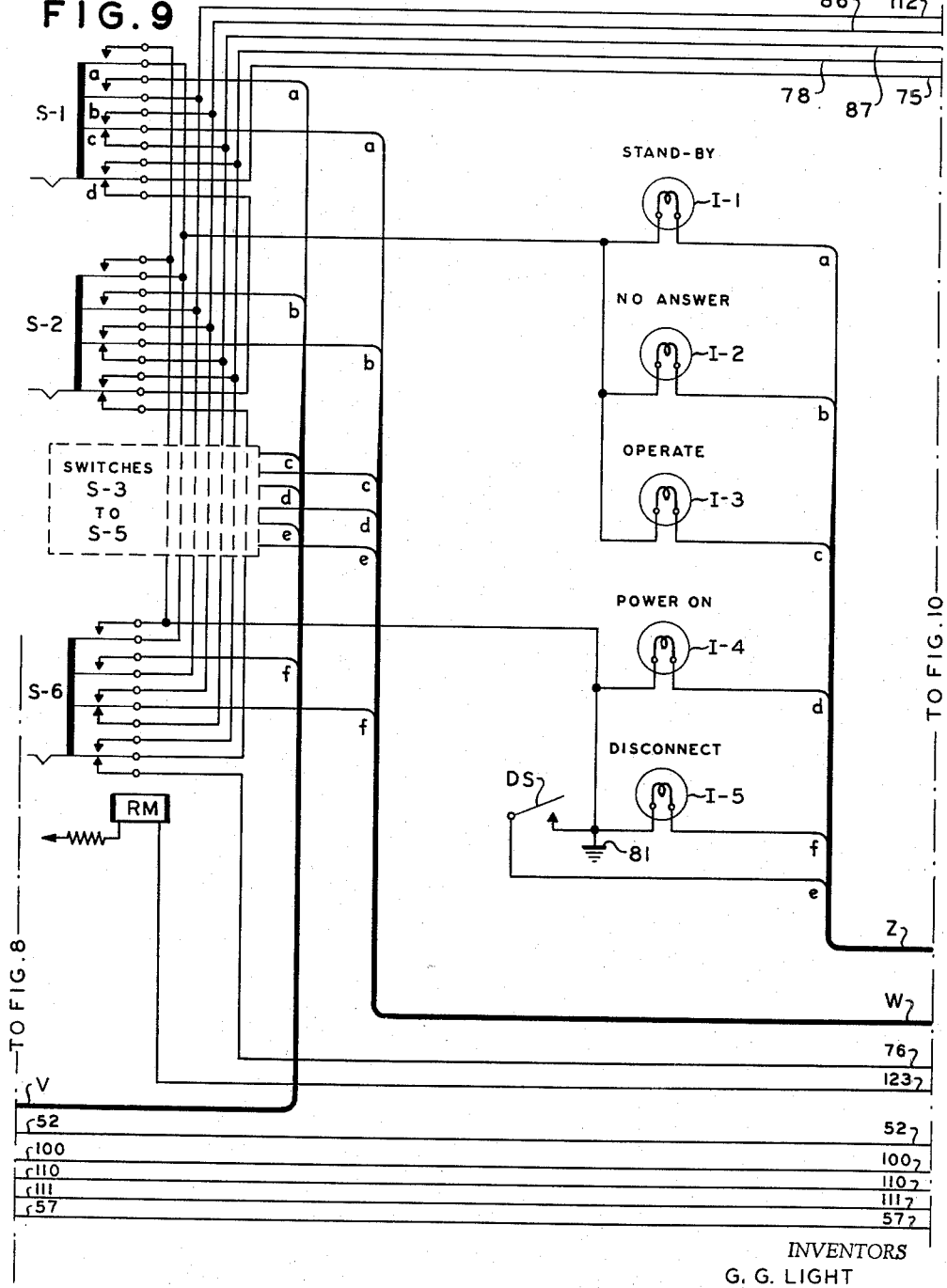
Figure 10:
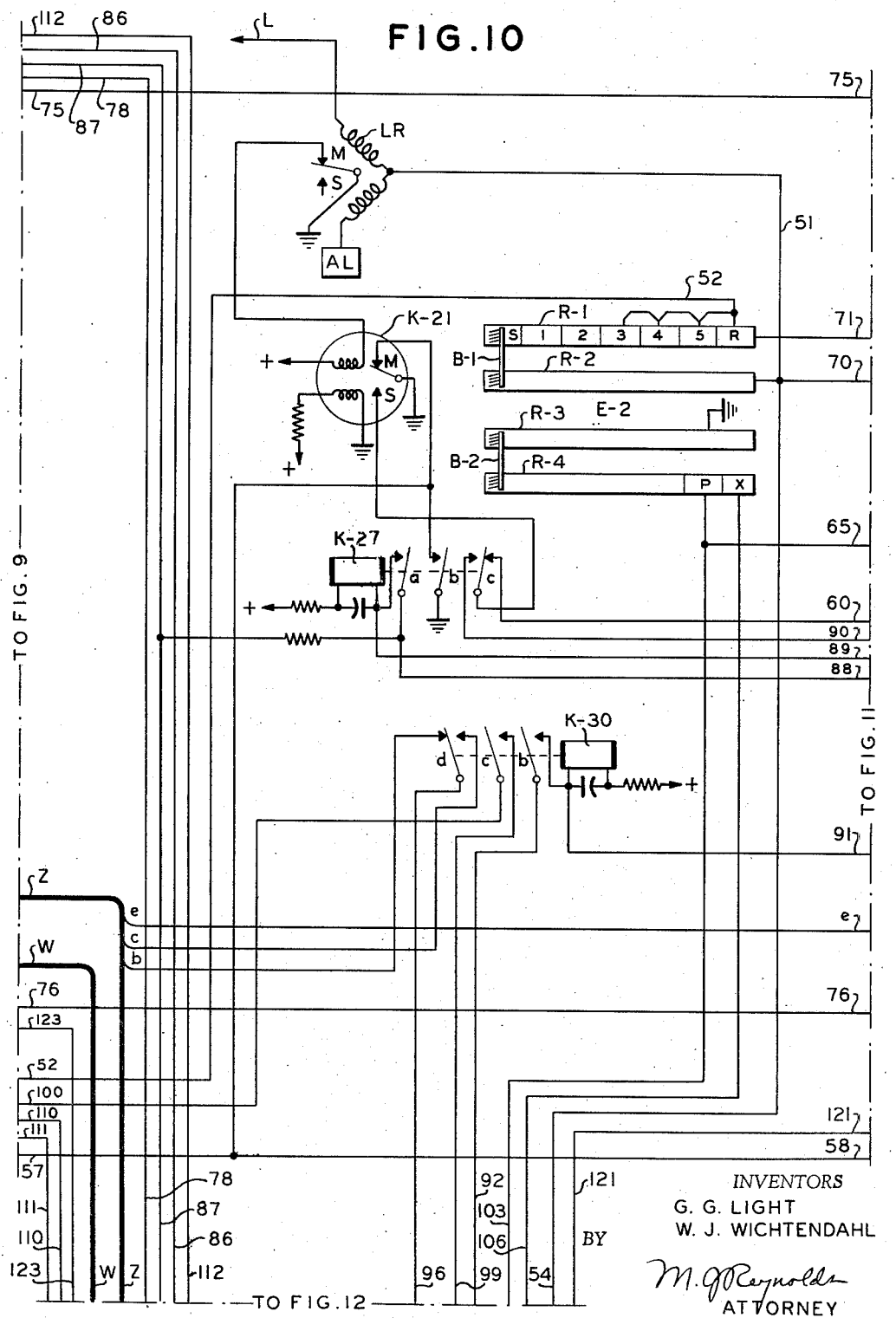
Figure 11:
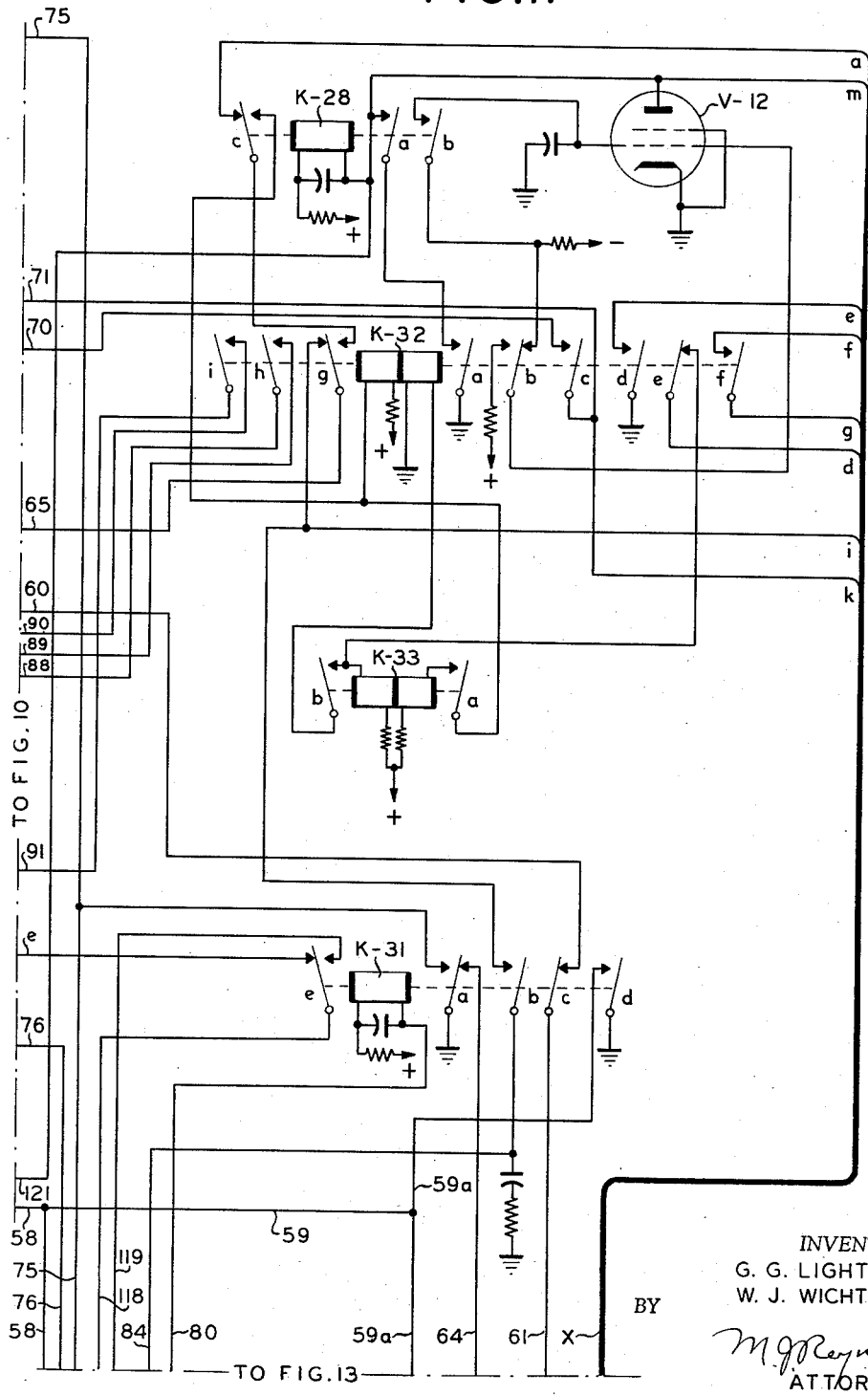
Figure 12:
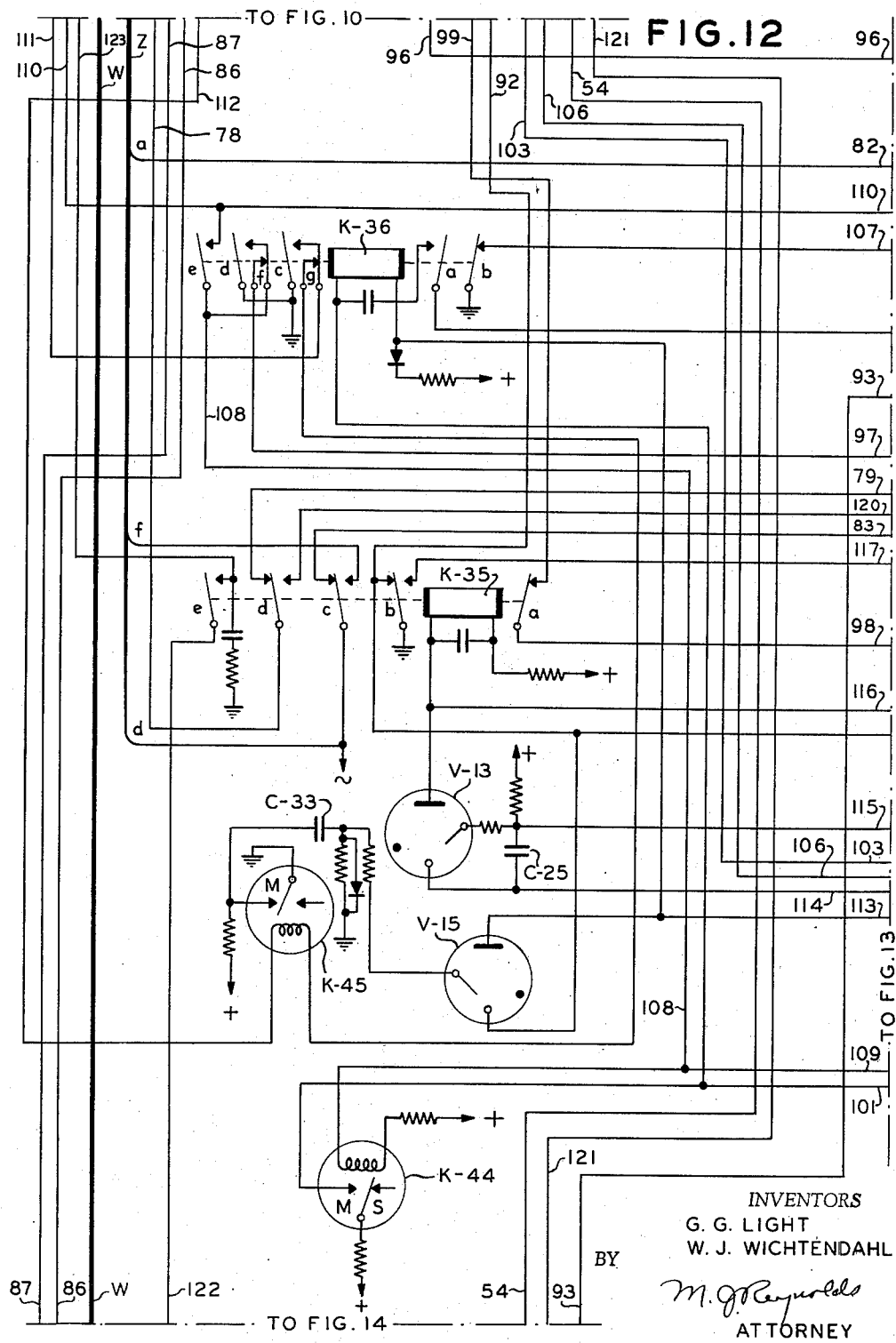
Figure 13:
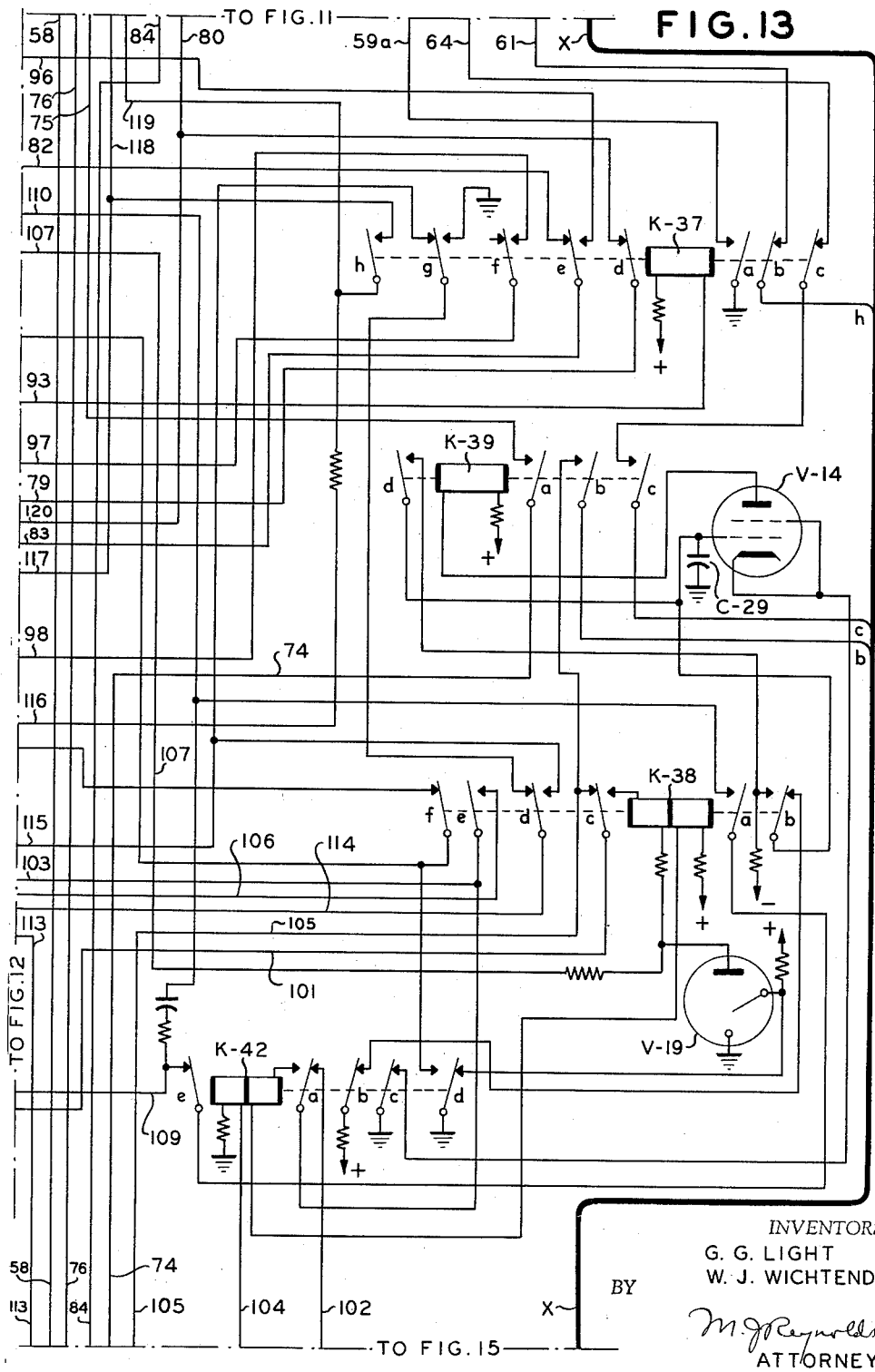
Figure 14:
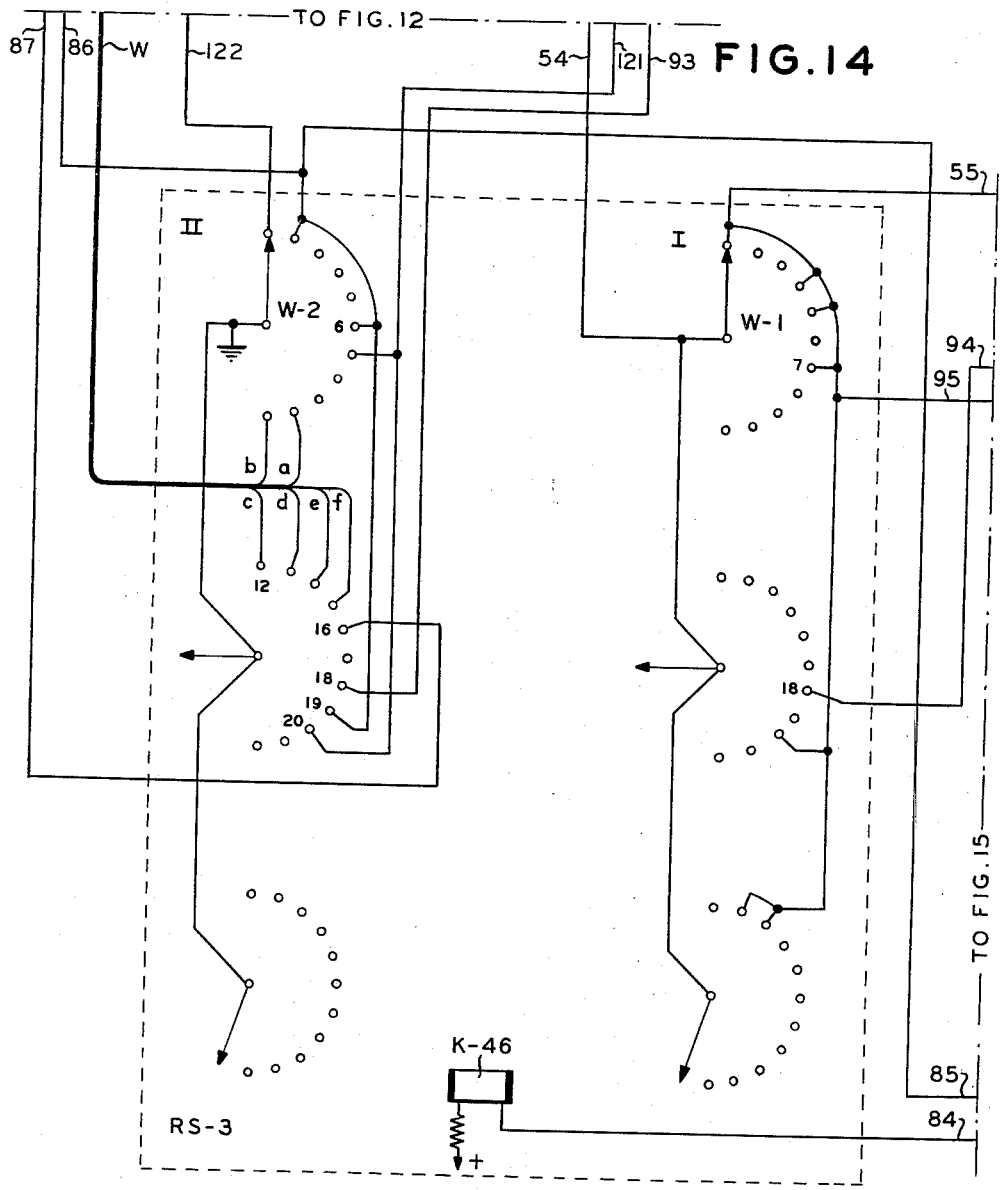
Figure 15:
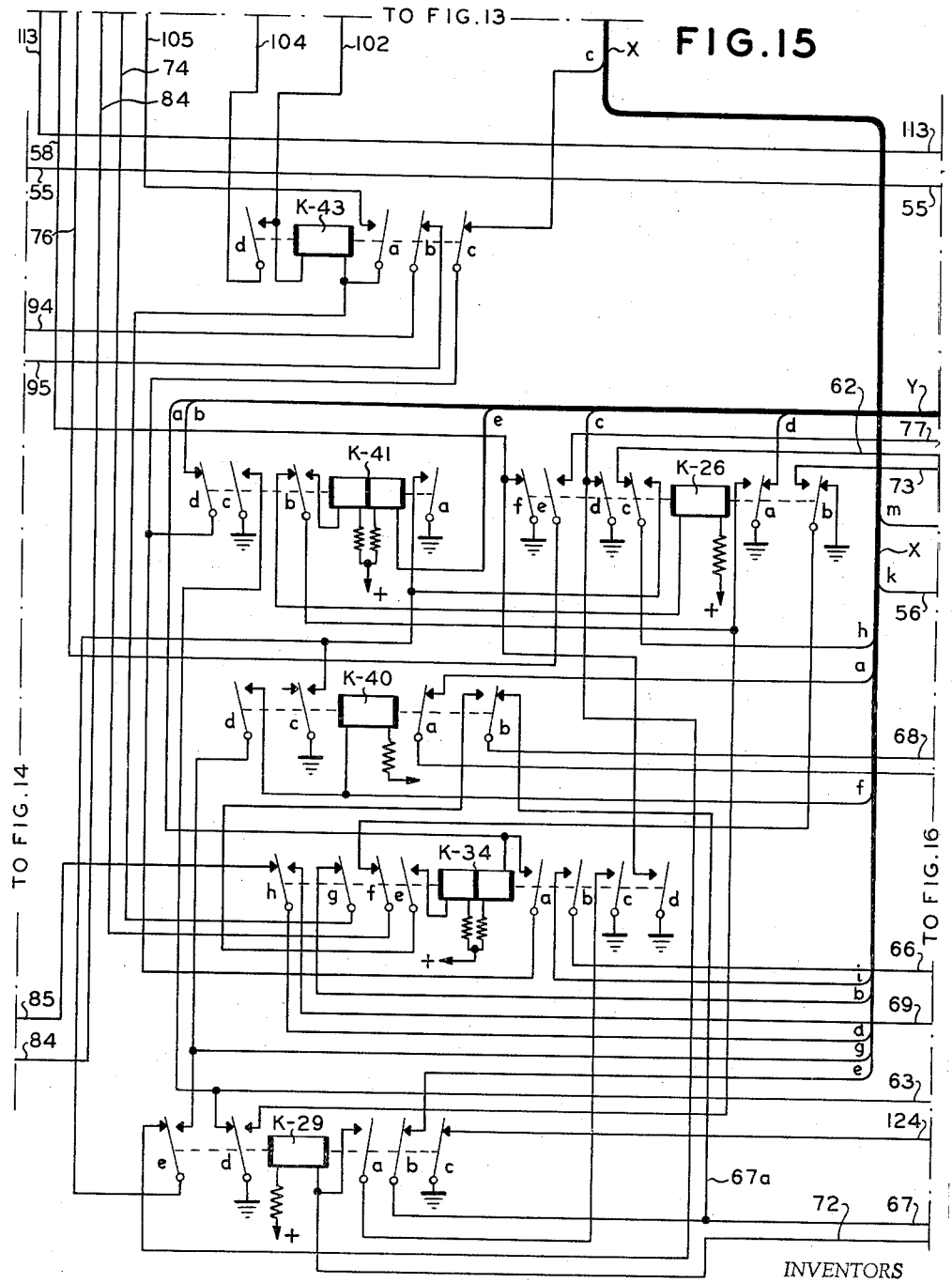
Figure 16:
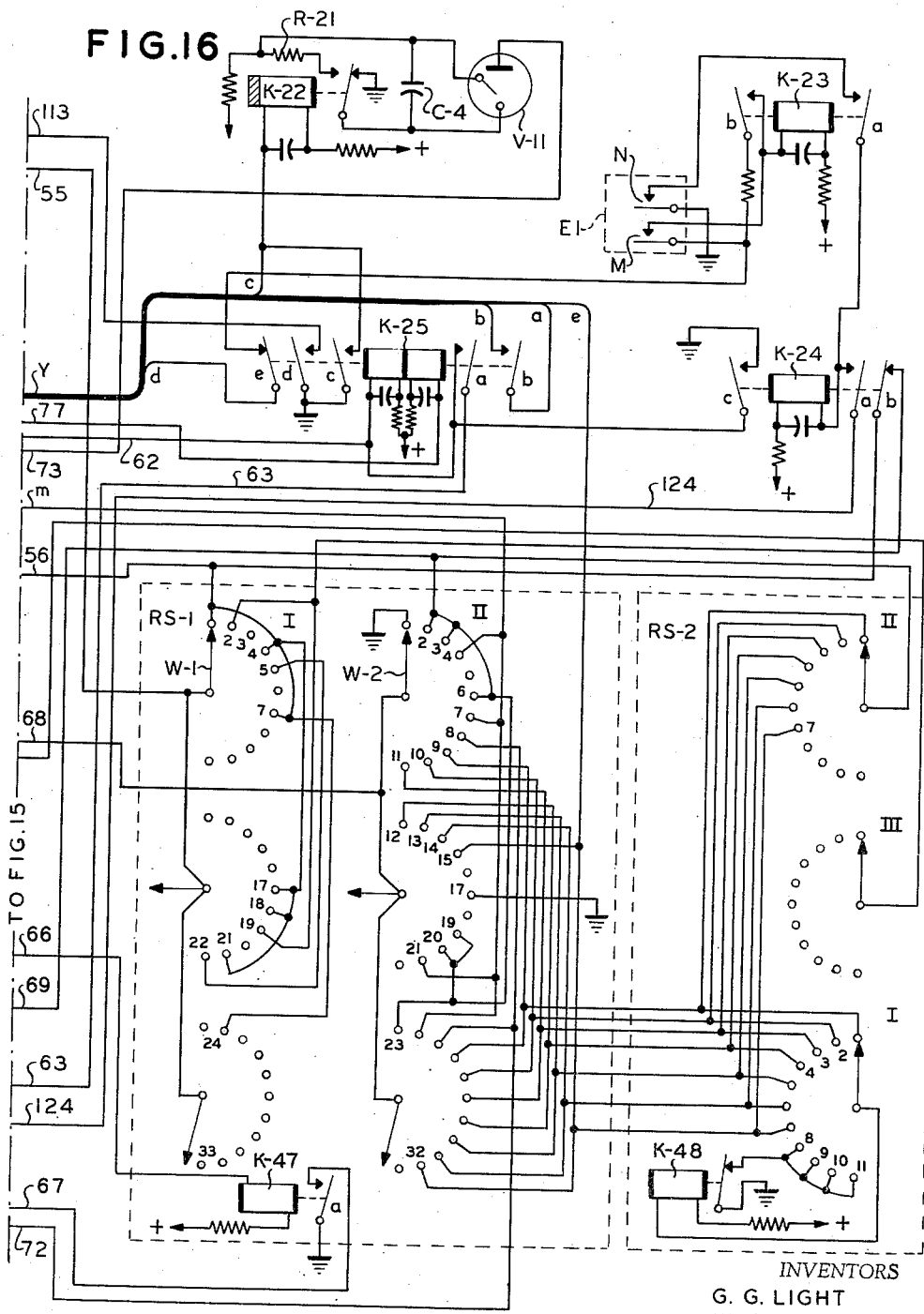

The equipment at the central office by which the invitation sequences and the selecting and cutting out sequences, shown in FIGS. 7A to 7E, are transmitted will now be described. This equipment comprises two major units, a selector unit (FIG. 9) and a control unit (FIGS. 10 to 16). In addition it includes sequential message numbering transmitters, a message text transmitter and receiving printer-reperforator equipment (FIG. 8).

The selector unit (FIG. 9) comprises a set of six self-locking selecting switches S-1 to S-6, one for each of the tributary stations contemplated by the system, a release magnet RM for the switches, signal lamps I-1, to I-5, later to be described, and a disconnect switch DS.

The control unit includes a rotary distributor E-2 (FIG. 10) from which the station selecting, station cutout and invitation signal sequences are transmitted, a rotary stepping switch RS-1 (FIG. 16) by which the invitation sequences are set up on the distributor E-2, a rotary switch RS-2 which programs the invitation dwells of the invitation sequences, a rotary switch RS-3 (FIG. 14) by which the station selections and station cutout signals are sequenced, a line relay K-21 (FIG. 10), for reception of incoming signals, an interval timer E-1 (FIG. 16) for initiating an invitation cycle when no tributary station requests are received for a predetermined time, and a number of control relays and timing tubes, the function and operation of which will appear in connection with the more detailed operating description which follows:

The sending-receiving line L (FIG. 10) extends through the line coil of the differential line relay LR and by the conductor 51 to the solid ring R-2 of the distributor E-2 and from segments 3, 4, 5 and R of the segmented ring R-1, over conductor 52, through the marking contact M of transmitting relay TR and thence to grounded battery. The winding of line relay K-21 is connected to the marking contact of the line relay LR so as to follow the incoming line signals. The rings R1 and R2 of distributor E-2 are normally shorted by a circuit extending from solid ring R-2, over conductor 54, through wiper W-1 and point 1 of rotary switch RS-3, conductor 55, wiper W-1 and point 1 of rotary switch RS-1, conductor 56 and wire K of cable X to the segmented ring R-2 of distributor E-2. The brushes of distributor E-2 are constantly rotating but the shunt circuit described prevents transmission of line signals therefrom. The distributor also has a pair of local rings R3-R4, the former of which is grounded and the latter of which has a probe contact P and a transmitting contact X.

The local receiving circuit extends from ground at the tongue of the line relay K-21, the marking contact M thereof, conductor 57 and the winding of recording relay RC-2, to battery. Supplemental ground is applied to the marking contact of line relay K-21 by conductor 58 at the back contact and tongue $f$ of a relay K-26 and further ground may be applied thereto at tongue $d$ of relay K-34, and by conductor 59 and branch circuits 59a at tongue $d$ of relay K-31 and tongue $a$ of relay K-37, whenever these relays are operated.

The normally ungrounded spacing contact of the line relay K-21 is connected through tongue $c$ and back contact of relay K-27, conductor 60, back contact and tongue $c$ of relay K-31, conductor 61, back contact and tongue $b$ of relay K-37, conductor $h$ of cable X, tongue $c$ and back contact of relay K-26, conductor 62, and the left winding of request relay K-25 to battery. Consequently when a request signal is received from one of the tributary stations, consisting of a 40 millisecond open line condition, line relay K-21 grounds its spacing contact, thus operating request relay K-25, which thus records the request. Relay K-25 locks up through its made tongue $a$ and conductor 63 to ground at the back contact and tongue $d$ of relay K-29. This received request signal constitutes the "busying character" of the inviting signal sequence shown in FIG. 7A. The remaining spacing pulses and marking intervals comprising this sequence are either transmitted by the distributor E-2 or by shorting the distributor rings for periods timed either by the probing segment P or a two-second timing tube V12 (FIG. 11) which controls operation of relay K-28. The operation of the control unit to send out the sequence illustrated in FIG. 7A will now be described.

*First invitation sequence*

The operation of relay K-25 caused operation of relay K-34 from battery through the right winding of K-34, conductor $a$ of cable Y, made tongue $b$ of relay K-25, conductor $b$ of cable Y, back contact and tongue $d$ of relay K-41, tongue $c$ and back contact of relay K-43, conductor $c$ of cable X, tongue $c$ and make contact of normally operated relay K-39, tongue $c$ and back contact of relay K-37, conductor 64, and back contact and tongue $a$ of relay K-31, to ground. Relay K-34 locks up to ground at relay K-31 through its tongue $a$ in shunt to the operating tongue $b$ of relay K-25.

The operation of relay K-34 completes a stepping circuit from the probe segment P of distributor E-2, by conductor 65, tongue $g$ and back contact of relay K-32, conductor $i$ of cable X, made tongue $b$ of relay K-34, and conductor 66 to the stepping magnet K-47 of switch RS-1, and thence to battery.

*Two seconds dwell.*—The two seconds dwell (interval $b$) following the request signal is created as follows: The first crossing of the probe segment, following operation of relays K-25 and K-34 steps rotary switch RS-1 to its point 2 at both levels I and II. The short-circuiting circuit for rings R1 and R2 of the distributor is extended from wiper W-1, point 2, back contact and tongue $b$ of relay K-24 to point 1 of level I of the rotary switch. Consequently during the following revolution of the distributor brush B1 no opening of the line will occur at segments S, 1 and 2 of the distributor. During this revolution of brush B2, as the probe segment is again engaged, the stepping magnet K-47 of switch RS-1 operates to advance its pawl without however advancing the switch, which only steps on release. During this operated period of magnet K-47 ground is applied from its made tongue, conductor 67, back contact and tongue $b$ of relay K-40, conductor 68, wiper W-2 and point 2 of level II, conductor 69, made tongue $h$ of relay K-34, conductor $d$ of cable X, tongue $e$ and back contact of relay K-32, to the left winding of relay K-33 to operate the same. Relay K-33 locks up over its tongue $b$ and right winding of relay K-32. Relay K-32 does not operate however until the operating ground from relay K-33 is lifted by release of the stepping magnet K-47 at the end of the probe pulse. Upon operation of K-32 at the end of the probe pulse it shorts the distributor rings R1 and R2 at made tongue $c$ and conductors 70 and 71, so that no space signals can be sent until this relay is released. Relay K-32 at its tongue $g$ also opens the probe circuit previously traced to the stepping magnet K-47, causing the wipers W-1, W-2 to move to point 3. It also removes negative battery from the grid of timing tube V-12, at tongue $b$ and applies positive battery thereto. Condenser C-9 becomes charged to positive potential and after two seconds renders the tube conducting from battery through the winding of relay K-28 and the anode of the tube to the grounded cathode. Thus relay K-28 operates and locks up through its tongue $a$ and made tongue $a$ of relay K-32. The locking circuit shorts tube V-12 causing it to extinguish. Relay K-28 also reapplies negative battery to the grid of tube V-12 through its tongue $b$. The first probe pulse following operation of relay K-28 is delivered over conductor 65, tongue $g$ and front contact of relay K-32, tongue $c$ and front contact of relay K-28, and made tongue $a$ of relay K-33 to its right or opposing winding, to thus knock relay K-33 down. This same pulse flows through relay K-32 in an operating direction to retain relay K-32 operated. At the end of the probe pulse relay K-32 releases, opening the holding circuit of relay K-28 at armature $a$. The release of K-32 also unshunts the distributor rings and substantially terminates the two second dwell following the received request pulse.

*Activating character (interval $c$).*—The movement of the stepping switch RS-1 during the operation and release of relays K-33, K-32 and K-28 placed it upon its point 3 and the release of relay K-32 restored the stepping circuit to the stepping magnet. At point 3 the short through wiper W-1 for the distributor rings R-1, R-2 is open. Therefore, the next revolution of the brush B1 opens the line circuit at the three distributor segments S, 1 and 2 to transmit the activating character of FIG. 7A, interval $c$.

*Two character dwell (interval $d$).*—The probe pulse occurring near the end of the transmission of the activating character energizes the stepping magnet K-47 and before its release, while the wipers are still on point 3, ground is again applied over the previously traced circuit through the tongue of the stepping magnet, wiper W-11 of level II and point 3 (strapped to point 2) to again operate relay K-33, and at the end of the probe pulse to operate relay K-32, at which time the stepping switch moves to point 4. This completes a circuit for relay K-28, independently of the 2 second timing tube V-12 from ground at made tongue $d$ of relay K-32, conductor $c$ of cable X, back contact and tongue $b$ of relay K-29, back contact and tongue $b$ of relay K-40, conductor 68, wiper W-11 and point 4 (level II) of switch RS-1, and conductor $m$ of cable X to the winding of relay K-28. The distributor rings R-1, R-2 are shorted at point 4, level I so that during the next revolution of the distributor brush steady marking is applied to the line to produce the first dwell character following the activating character. The proble pulse occurring near the end of this revolution is diverted by relays K-32 and K-28 to the opposing winding of relay K-33, as before described, to knock relay K-33 down and at the end of the pulse relays K-32 and K-28 release restoring the stepping circuit to the step magnet K–47. The rotary switch RS–1 remains on point 4, to short the distributor for the next rotation thereof, to thus transmit the second successive dwell of the sequence.

*Step 1 and step 2 pulses (intervals e and f).*—Near the end of the revolution (2nd dwell), with relay K–32 released, the probe pulse energizes step magnet K–47 but relay K–33 does not operate as before since its circuit is open at point 4, level II of the rotary switch RS–1. At the end of this pulse the switch steps to point 5, opening the short across the distributor rings. The next rotation of the distributor, therefore, transmits step pulse 1 from its open contacts S, 1, 2. Near the end of this rotation the probe pulse steps the switch to point 6, which also is not included in the distributor shorting circuit so that the next rotation of the distributor sends a step 2 pulse to the line.

*Second two character dwell (interval g).*—Near the end of the step 2 rotation the probe pulse energizes stepping magnet K–47 to again apply ground through point 6 (strapped to point 2), level II to relay K–33 and at the end of the pulse relay K–32 operates as before described, and switch RS–1 steps to point 7 again shorting the distributor at level I and operating relay K–28 through point 7, level II. Thus during the next two revolutions of the distributor two full character dwells occur. The probe pulse of the first revolution knocks down relays K–33, K–32 and K–28 as before, and the second probe pulse steps switch RS–1 to point 8.

*Third and fourth step pulses (intervals h and i).*—At point 8, level I, of switch RS–1 the short is absent from the distributor E–2 so that the following revolution sends the third open step pulse to the line. The probe pulse of this revolution operates K–47 again whereupon ground at its tongue is extended over conductor 67, through tongue *b* and rear contact of relay K–40, conductor 68, wiper II, point 8, level II of the rotary switch, and conductor 72 to the winding of relay K–29, which operates and (1) locks up through its tongue *a* and made tongue *c* of relay K–34; (2) applies ground at its made tongue *d* and tongue *b* and rear contact of relay K–41 to the operating winding of relay K–26, which operates and locks up over a circuit including tongue *b* and back contact of relay K–41 and made tongue *a* of relay K–26; (3) releases the locking circuit of request relay K–25 at operated tongue *d*. The previously traced made circuit of relay K–25, extending from the spacing contact of the line relay K–21 to the winding of relay K–25 is also opened at tongue *c* of operated relay K–26. At the end of the probe pulse which initiated the operation of relay K–29 the rotary switch RS–1 steps to its point 9 which is open at level I, and the next rotation of the distributor sends the fourth step pulse (station 1 selection pulse) to the line. This as will be noted from FIG. 7A is to be followed by a two-second dwell.

*Two-second invitation dwell (interval j).*—At the end of the distributor revolution which produced the step 4 pulse, step magnet K–47 applies ground from its armature, conductor 67, tongue *b* and rear contact of relay 40, conductor 68, wiper W–2 of RS–1, point 9, level II, and point 1, level I of rotary switch RS–2 to energize the step magnet K–48 of switch RS–2. The same ground is also extended through point 1, level II of RS–2 and conductor 69 over the previously traced circuit to relay K–33. At the end of the probe pulse switch RS–1 moves to point 10; switch RS–2 moves to point 2; relay K–32 operates from relay K–33 and shorts the distributor; and tube V–12 is actuated after a two-second interval to produce the long dwell, as previously described. At the end of this two-second period relay K–28 operates. The first probe pulse following operation of K–28 knocks down relay K–33 and at the end thereof relays K–32 and K–28 release. The long dwell introduced by the above operation constitutes the invitation interval for station 1. If station No. 1 has a message to transmit, it sends a 40 milli-second open or answer-back signal during this invitation period. The receipt of this pulse will condition the relay station unit to transmit a series of seven stepping pulses without intermediate dwells, to step the tributary office switches to their home position. It will be assumed for the present description that station No. 1 has no message to transmit but that a message is awaiting transmission at station No. 2. Therefore, under this assumption there will be no answer back pulse received during the two second dwell following the No. 1 station selection pulse (step pulse 4). In this event the central office will send the fifth stepping pulse (station No. 2 selection) followed by a two second dwell as shown in FIG. 7A.

*Station 2 invitation (intervals k and l).*—With the rotary switch RS–1 on point 10, which is open at level I, and RS–2 on point 2 the next revolution of the distributor will send a space pulse to line (step 5). The next probe pulse will energize step magnet K–47 to apply ground through point 10, level II of RS–1, and point 2, level I of switch RS–2 to again energize step magnet K–48 and also to apply this ground through point 2, level II of switch RS–2 to again operate relay K–33 and at the end thereof, to operate relay K–32, tube V–12 and relay K–28, as before to send the invitation dwell to the line and step switch RS–1 to point 11 and RS–2 to point 3.

Under the assumption that station No. 2 has a message to transmit, it will respond during this long dwell to send the 40 millisecond answer back space-signal to the relay station. The line relay K–21, FIG. 10, moves to spacing on receipt of the answer back signal, applying ground from the spacing contact through tongue *c* and back contact of relay K–27, conductor 60, back contact and tongue *c* of relay K–31, conductor 61, back contact and tongue *b* of relay K–37, conductor *h* of cable X, tongue *c* and make contact of relay K–26, tongue *e* and make contact of relay K–29, conductor 9 of cable X, tongue *f* and make contact of relay K–32, conductor *f* of cable X, and winding of relay K–40, which operates and locks to ground through its operated tongue *d*, operated tongue *e* of relay K–29 and operated tongue *c* of relay K–40.

*Steps 6 to 11 (intervals m to r).*—The operation of relay K–40 (1) at its tongue *b* opens the operating circuit for relays K–33 and the stepping magnet K–49 of switch RS–2 so that they cannot be operated. The probe pulse at the end of the 2 second dwell, during which the 40 millisecond answer-back signal was received, knocks down relay K–33 and the end of the pulse relays K–32 and K–28 release, with the rotary switch RS–1 still on point 11. The next six revolutions of the distributor, which is unshorted at points 11 to 16 of switch RS–1, sends out six stepping pulse without intermediate dwells and switch RS–1 is stepped to its point 17. These stepping pulses step all of the tributary station switches RSS to their home position. Point 17, level I, shorts the rotary distributor to prevent further stepping pulses from being transmitted.

Engagement of wiper W–11 with grounded point 17 of level II of switch RS–1 applies ground from this point over conductor 68, made tongue *b* of relay K–40 and operated tongue *e* of relay K–34 to the left winding of relay K–34 to cause an opposing current to flow therein, thereby to release relay K–34. With relay K–34 released the path of the probe pulse to step magnet K–47 is open at tongue *b* thereof and the holding circuit for relay K–29 is opened at tongue *c*. Release of relay K–29 opens the holding circuit for relay K–40 at tongue *e* of K–29 allowing K–40 to release. Also one of the holding grounds applied to the marking contact of the line relay K–21 is removed at tongue *d* of relay K–34.

With the tributary station selector switches in their home positions, station No. 2 will be conditioned to transmit to the central office as described with reference to FIGS. 3 to 6. The first space signal of this message transmission operates the line relay K–21 to its spacing contact to apply ground from the line relay through tongue c and back contact of relay K-27, conductor 60, back contact and tongue c of relay K-31, conductor 61, back contact and tongue b of relay K-37, conductor h of cable X, tongue c and make contact of relay K-26, tongue e and back contact of relay K-29 and conductor c of cable Y, to the winding of relay K-22. Relay K-22 is slow-to-release and hence stays operated by the intermittent ground applied by the message spacing pulses, during continuous message transmission from the tributary station.

Magnet RC-2 in the local circuit of the line relay K-21 follows the received signal and controls the operation of a recording printer reperforator PR at the central office.

*Second invitation sequence*

When the message transmission from the tributary station is finished by running out of the tape or is otherwise interrupted, the line goes continuously marking and relay K-22 releases by removal of its operating ground at the line relay K-21. Release of relay K-22 removes resistance R-21 across condenser C-4 and grounds the cathode of timing tube V-11. The condenser charge builds up and after a period of thirty seconds tube V-11 conducts. Any operation of relay K-22 during this thirty second interval as by resumption of transmission will discharge condenser C-4 to restart the charging cycle. If no further operation of relay K-22 occurs and if none of the station selection switches S-1 to S-6 are operated to select a particular tributary station, the operation of which will later appear, tube V-11 will eventually conduct and close a circuit from ground at its cathode, through the tube, conductor 73, made tongue b of relay K-26, back contact and tongue f of relay K-34, conductor 74, tongue a and front contact of relay K-39, conductor 75, tongue d and its lower contact of station selector switches S-1 to S-6 in series, conductor 76, tongue e and make contact of relay K-26 and conductor 77 to right coil of relay K-25. Relay K-25 locks up in the same manner previously described in connection with its operation in response to a request signal. It operates relay K-22 over its tongue c to extinguish tube V-11 and initiates another invitation sequence of the same nature as that just described.

Since points 17 and 19 to 33 of the rotary switch RS-1 are wired in parallel to points 1 to 16 (extra point 18 being passed during the dwell interval b) it may be assumed, for ease of explanation, that wipers W-1, W-11 are again on points 1 of the switch. Since station No. 2 was last selected for operation the wipers of switch RS-2 will be on points 3. In this next invitation cycle relays K-34, K-33, K-32, K-28 and K-29 operate and relay K-25 releases as previously described to transmit the busying, activating and step 1, 2 and 3 pulses. However, when the wipers of rotary switch RS-1 reach points 9 and 10 to transmit the step 4 and 5 spacing signals (station Nos. 1 and 2 identification), the ground from stepping magnet K-47 cannot operate stepping magnet K-48 or relay K-33 since the operating circuit for these elements is open at points 1 and 2 of switch RS-2, the wipers of which now rest on point 3. Consequently there is no dwell following the fourth and fifth stepping pulses (stations Nos. 1 and 2 selection) and station No. 3 is the first station afforded an opportunity to transmit. However, with switch RS-1 on point 11 the next probe pulse will apply ground from stepping magnet K-47, point 11 of level II of RS-1 and point 3 of RS-2 level I to step magnet K-48, and from point 3 of level II to operate relay K-33. This results in a two second dwell being applied to the line following the step 6 pulse (station No. 3 selection) which invites station No. 3 to transmit. If station No. 3 responds with a 40 millisecond open answer-back signal, relay K-40 will again operate in response thereto, resulting in elimination of further dwells between the remaining stepping signals, and rotary switch RS-2 will move onto its point 4 and rest there until the next invitation cycle. If station No. 3 does not respond, further step pulses and dwells are transmitted to invite each of stations No. 4, 5 and 6 in turn, rotary switch RS-2 advancing one point of each station invitation.

Eventually, either in this or in a succeeding invitation sequence the final or station No. 6 will be invited to transmit by the provision of a two second dwell following the ninth step pulse. If station No. 6 has no message to transmit it will not transmit the 40 millisecond open during its invitation dwell period. When no such answer-back or acceptance signal is received in the invitation sequence relay K-40 which operated, as previously described, in response to such answer-back signal, remains unoperated. When switch RS-1 reaches point 15 with relay K-40 unoperated, the next probe pulse operates step magnet K-47 causing ground through its armature to be extended through back contact and tongue b of released relay K-40, wiper W-2 point 15 of switch RS-1, point 7, level I of switch RS-2 and its wiper to operate step magnet K-48. The same ground through point 7, level II of RS-2 and its wiper, conductor 69, front contact and armature h of relay K-34, conductor d of cable X, armature f and back contact of relay K-32 and left winding of relay K-33 to battery, operates the latter relay. Relay K-33 locks up and at the end of the probe pulse operates relay K-32, as previously described to introduce a tow second dwell following the tenth step pulse. Switch RS-2 also steps to point 8 at the end of the probe pulse from which itself steps to its home position at point 1. This long dwell serves at the tributary station to release relays K-7 and K-9 as described with reference to FIGS. 3 to 6 and thus restore the tributary station relays to normal.

While switch RS-1 is still on point 15 with step magnet K-47 energized ground is applied through its armature at conductor 67, 67a, back contact and tongue of relay K-40, conductor 68, wiper W-2 and point 15 of switch RS-1, and conductor e of cable Y to the winding of relay K-41 to operate the same. Relay K-41 locks up through its left winding and make armature b, and make armature d of relay K-29 to ground. Relay K-40 is operated from ground at make tongue a of relay K-41, make tongue e of relay K-29, conductor g of cable X, make tongue f of relay K-32, and conductor f of cable X to the winding of relay K-40. The locking circuit of K-26 is broken at armature b of relay K-41 and relay K-26 releases. At the end of the probe pulse switch RS-1 steps to point 16 and at the end of the dwell (following step 10) it moves to point 17. Ground at point 17, level II of RS-1 through conductor 68, make tongue b of relay K-40 and make tongue e of relay K-34 knocks this latter relay down. Relay K-34 on release opens the locking circuit for relay K-29 and relay K-29 in turn opens the locking circuits for relays K-40 and K-41 so that they release. Upon release of these relays the central office set is restored to normal and in condition to respond to the next request signal from the tributary station.

If station No. 6 had accepted its invitation, relay K-40 would have been in an operated condition as RS-1 was stepped onto point 15 and no dwell would have been introduced after step 10 to close-out the tributary station. However, following message transmission from station No. 6, relay K-25 would reoperate, as described before, and cause a final signal sequence to be transmitted under the direction of rotary switch RS-1. During this sequence, rotary switch RS-2 rests on point 7, in which position no invitation dwells will be inserted; following station identifying step pulses 4 through 9 and consequently none of the tributary stations may respond to send an answerback signal to the central office and as a consequence relay K-40 will be unoperated when the rotary switch RS-1 comes to rest on point 15 so that a two second dwell will be inserted after the tenth stepp ulse for the purpose of restoring the tributary station relays to normal, as described. Switch RS-1, at point 15, level II, effects operation of relay K-41 which in turn operates relay K–40, heretofore described. Relay K–40 effects the release of relay K–26 and as switch RS–1 moves over point 16 onto point 17 following the dwell period relays K–34, K29, K–40 and K–41 are released to restore the central office set to normal to receive another request.

*Selecting a tributary station for reception of a message*

The central office may at any time operate one of the station selection switches S–1 to S–6 to select a tributary station to receive from the central office. If the circuit is busy at the time the station selecting switch is operated the actual selection waits until the line becomes idle. By way of example, let it be assumed that the central office has a message for transmission to tributary station No. 2. The switch S–2 (FIG. 9) will be operated and locked in its lower or operated position. These switches each have a set of four movable tongues a, b, c and d and cooperating stationary contacts. Tongue d and its lower contact of all switches are connected in a series circuit, with the winding of relay K–25 as previously traced. Otherwise, with the exception of tongue c and upper contact of tongue b, all corresponding tongues and contacts of the six switches are connected in multiple. Tongue a controls the operation of the signal lamps; tongue b the operation of the automatic message numbering machine, one of which is provided for each tributary station; tongue c determines the station selection and tongue d initiates the selection cycle.

Upon operation of switch S–2 for selection of tributary station No. 2, ground on the back contact and tongue b of relay K–26 (FIG. 15) is applied through back contact and tongue f of relay K–34, conductor 74, tongue a and make contact of normally operated relay K–39, conductor 75, tongue d and lower contact of station selection switch S–1, tongue d and upper made contact of station selection switch S–2, conductor 78, tongue d and back contact of relay K–35, conductor 79, tongue d and back contact of relay K–37 and conductor 80 to the operating winding of relay K–31. Relay K–31 operates and locks up through the traced tongues of relays K–37 and K–35, switch S–2, switch S–1 and conductor 75 to the tongue a of relay K–31. Switch S–2 at its tongue a and upper made contact applies ground 81 (FIG. 9) to one terminal of signal lamps I–1, I–2 and I–3. Standby light I–1 only operates, however, over a circuit from its opposite terminal, conductor a of cable Z, conductor 82, back contact and tongue e of relay K–37, conductor 83, back contact and tongue c of relay K–35 to A.C. power.

The first probe pulse from segment P of the distributor E–2, following operation of relay K–31, is sent from the distributor over conductor 65, through tongue g and back contact of relay K–32, make contact and tongue b of relay K–31, and conductor 84 to the step magnet K–46 of rotary switch RS–3, which at end of the pulse steps the switch to point 2. The wiper W–1 of level I of this switch, it will be remembered, is in the shorting circuit of distributor E–2 and movement of the switch to point 2 opens this short at that point. At the same time ground from wiper W–2 of level II applies ground through point 2, conductor 85, back contact and tongue h of relay K–34, conductor d of cable X, and tongue e and back contact of relay K–32 to the winding of relay K–33, which operates. The next revolution of the distributor transmits a space or busy signal from segments S, 1 and 2 of ring R–1 and the following probe pulse steps switch RS–3 to point 3, removing at level II the operating ground for relay K–33. This causes relay K–33 to lock up over its tongue b and the winding of relay K–32, as previously described. Relay K–32 reshorts the distributor at tongue c, opens the stepping circuit to switch RS–3 at tongue 3 and removes negative and applies positive battery to the grid of timing tube V–12 to produce a two second dwell following the busying character. After relay K–28 operates through tube V–12, the following probe pulse knocks down relay K–33 and at the end of the pulse relays K–28 and K–32 release, as before described. Release of relay K–32 opens the short across the distributor rings and during the following revolution distributor E–2 sends the activating character to the line (FIG. 7C). The next two probe pulses step switch RS–3 successively to points 4 and 5, in each of which positions the distributor E–2 is again shorted at level II. Consequently a two character dwell is applied to the line. At the end of the second character dwell, rotary switch RS–2 steps to point 6, again removing the short from the distributor at level I and operating relay K–33 at level II. This results in a step pulse being transmitted, exactly the same as occurred at point 3. At point 6, level II, relay K–33 is operated as described with reference at point 3 and as switch RS–3 steps to point 7 following transmission of the first step pulse, relay K–32 operates in series with relay K–33 again shorting the distributor and opening the stepping magnet circuit. Relay K–28 operates from ground at wiper W–11, point 7, level II, which causes release of relays K–33 and K–32 at the end of the next revolution of the distributor, as has been described. Thus switch RS–3 stays on point 7 for one extra revolution, to produce the second two character dwell (FIG. 7C). The rotary switch RS–3 now steps of points 8, 9 and 10, at which points the distributor is unshorted, to thus transmit step pulses 2, 3 and 4 in succession.

If station No. 1 is to be selected, the ground at level II point 10 would be extended through tongue c and the upper make contact of switch S–1 to operate relay K–33. However, since in the assumed operation station No. 2 is to be selected, relay K–33 will remain unoperated and switch RS–3 will step to its point 11, thus sending an additional or step 5 pulse which is the station No. 2 identifying pulse. At point 11, level II of RS–3, ground is applied over conductor b of cable W, through the c tongue and upper contact of station selection switch S–2 and thence by conductors 86 and 85, back contact and tongue h of relay K–34, conductor d of cable X, and tongue e and back contact of relay K–32 to the operating winding of relay K–33. The next probe pulse steps RS–3 to point 12, operates relay K–32 to short the distributor, stops the stepping of switch RS–3 and introduces, through tube V–12, a two second dwell. Ground at point 12, level II, is extended by conductor c of cable W through armature c of station selecting switch S–3 and lower contact thereof, conductors 87, 88, tongues h and make contact of relay K–32 and conductor 89, to the winding of relay K–27 which operates and locks up at its tongue a in shunt to the contacts of relay K–32.

The two-second dwell, as described with reference to FIGS. 3 to 6, selects station No. 2, which in response thereto sends out during this dwell an answer-back 40 millisecond open line condition as previously described.

When this answer-back signal is received at the central office, it causes ground to be applied from the spacing contact of line relay K–21, tongue c and make contact of relay K–27, conductor 90, operated tongue i of relay K–32, and conductor 91, to the winding of relay K–30, which operates and locks up through its tongue b, conductor 92, and tongue b of relay K–35.

The next probe pulse, following the 2-second timed operation of relay K–28, knocks down relay K–33 and, as a consequence, relays K–32 and K–28 release. The succeeding six revolutions of distributor E–2 step the rotary switch RS–3 onto points 13 to 18 with the distributor E–2 unshorted thereby to transmit step pulses 6 to 11 (FIG. 7C), which advance the tributary station rotary switches to their home position. Ground at point 18, level II of switch RS–3, over conductor 93, operates relay K–37, and the wiper W–1 at level I, point 18, shorts the distributor E–2 over conductor 94, tongue b and back contact of relay K–43, conductors 95 and 55, wiper W–1 and point 1, level I of switch RS–1, conductor 56, conductor k of cable X, conductor 71, rings R-1, R-2 of distributor E-2, and conductor 54 back to wiper W-1 of switch RS-3. "Standby" lamp I-1 is extinguished at tongue e of relay K-37 and "operate" lamp I-3 is energized from power through tongue c and back contact of relay K-35 (FIG. 12), conductor 83, tongue e and make contact of relay K-37, conductor 96, tongue d and make contact of relay K-30, and conductor c of cable Z to the lamp I-3.

If the answer-back had not been received to operate relay K-30, this power circuit would have extended from tongue d and break contact of relay 30 and conductor b of cable Z to "no answer" lamp I-2 rather than the "operate" lamp I-3.

With relay K-37 operated at the end of the stepping sequence a circuit is completed for the relay K-44 (FIG. 12) from battery through the relay winding and over a circuit extending though the closed make-before-break contacts f of tongue d of relay K-36, conductor 97, tongue f and make contact of relay K-37, conductor 98, tongue a and back contact of relay K-35, conductor 99, make contact and tongue c of relay K-39 and conductor 100, to the clutch magnet CM-A (FIG. 8) of transmitter A and the tape-out and lever contacts thereof to ground. The current in this circuit is sufficient to operate relay K-44 but insufficient to operate the transmitter clutch magnet CM-A.

Relay K-44 applies battery through its made contact M, conductor 101, tongue c and back contact of relay K-38, operated tongue b of relay K-39, conductor b of cable X, and back contact and tongue g of relay K-34 to the coil of relay K-43 and thence by conductor 102, back contact and tongue a of relay K-42 and conductor 103 to the probe pulse P of distributor E-2. Thus the probe pulse, following operation of relay K-44, will operate relay K-43. At the end of the probe pulse current through the left coil of relay K-42, conductor 104, tongue d and winding of relay K-43, its tongue a, conductor 105, back contact and tongue c of relay K-38, conductor 101, and contact M of relay K-44, operates relay K-42 and holds relay K-43 operated.

Relay K-39, which is normally operated by a circuit from battery through its winding, the anode and cathode of tube V-14, and back contact and tongue c of relay K-42, is released by the above mentioned operation of relay K-42. The operation of relay K-43 opened the short from point 18 of switch RS-3, across the distributor rings so that the next rotation of E-2 transmits a message activating character to the tributary station to condition the printer at the selected station for response to line signals. The probe pulse at the end of this rotation is directed over conductor 103, tongue a of relay K-42 and its right holding winding to the right winding of relay K-38, to operate relay K-38. Relay K-38, at its tongue c, opens the holding circuit for relay K-43 which releases and restores the short to the distributor E-2. The following pulse from the transmitter segment X of ring R-4, is directed over conductor 106 and operated tongue e of relay 38, operated tongue a and right winding of relay K-42, and right winding of relay K-38 and serves to keep relay K-42 operated until the end of the pulse at which time relay K-42 releases. Relay K-38 remains operated from battery at contact M of operated relay K-44, conductor 101, operated tongue c of relay K-38 and its left winding, and conductor 107, to ground at tongue b of relay K-36.

With the release of relay K-42, a circuit is completed from ground at the text transmitter Txr. A, over a previously traced circuit including the clutch magnet CM-A of the transmitter and the tongues of relays K-30, K-35, K-37, K-36 and thence from contact f of relay K-36 over a circuit including conductors 108, 109, tongue e of relay 42, tongue a of relay K-38 and conductor 110, to the windings of relay RA in series (FIG. 8) and made tongue b of normally operated relay RNN to battery. Relay RA operates but the current is not sufficient to operate the clutch magnet CM-A of transmitter Txr. A. Relay K-44 which also derives its ground at the transmitter CM-A, as previously described, remains operated.

The operation of relay RA applies battery at its left tongue, back contact and tongue a of relay RN, conductor 111, make-before-break contacts g of tongue c of relay K-36, through the winding of relay K-45, conductor 112, tongue b of station selection switch S2 and its closed contact and thence by conductor b of cable V to the clutch magnet CM-2 of the numbering machine provided for station No. 2, and the letters sensing contact LS thereof to ground. Relay K-45 is thus operated together with the clutch magnet of the numbering machine. Current also flows from the contacts of relay RA through the winding of relay RN but the shorting effect of the number transmitter keeps RN from operating. The numbering machine Txr. 2 operates through a numbering cycle, sending to the line L through the relay TR. At the end of the numbering cycle the letters sensing contacts LS open the operating circuit for the numbering machine and relay K-45 and allow sufficient current to flow in the winding of relay RN to operate the same. Subsequent closure of the letters sensing contacts LS does not cause further operation of the numbering machine since its circuit is opened at armature a of relay RN.

At this time relays K-30, K-37, K-44, K-38, RNN, RA and RN are operated and relay K-45 is just released. Removal of ground at the contact M of relay K-45 sends a negative pulse through condenser C-33 causing tube V-15 to conduct. Current through tube V-15, over a circuit from battery at the tongue of relay K-44, its left contact, coil of relay K-36, anode-cathode of tube V-15 and ground at tongue b of relay K-35 causes relay K-36 to operate. Relay K-36 opens the holding circuit for relay K-38, which releases but relay K-44 remains operated from ground at operated tongue d of relay K-36. Relay RA (FIG. 8) also remains operated from ground at the made tongues d and e of relay K-36. The circuit for the clutch magnet CM-A of text transmitter Txr. A is opened at the make-before-break contacts f, associated with tongue d of relay K-36. During the operated time of relay K-36, condenser C-29 of tube V-14 is charged to negative battery through made tongue b of relay K-38. Upon the release of relay K-38 condenser C-29 starts to charge to positive through tongue b of relay K-38 and its back contact, and tongue b and back contact of relay K-42, causing tube V-14 to conduct when the voltage across C-29 is approximately zero. This completes a circuit from battery through the winding of relay K-39, tube V-14, and ground at tongue c of relay K-42. During the charging time of condenser C-29, slow-to-release relay RNN (FIG. 8) releases, shorting the left or high resistance winding of relay RA. Following the release of relay K-38, a probe pulse is transmitted from distributor E-2, over conductor 103, tongue a and back contact of relay K-42, conductor 102, coil of relay K-43, tongue g and rear contact of relay K-34, conductor b of cable X, tongue b and make contact of relay K-39, rear contact and tongue c of relay K-38 and conductor 101 to battery at the tongue of relay K-44, thus causing relay K-43 to operate. Relay K-43 holds up at the end of the probe pulse from ground through the left winding of relay K-42, conductor 104, operated tongue d of relay K-43, its coil and operated tongue a, conductor 105, back contact and tongue c of relay K-38, and conductor 101, to battery at the tongue of relay K-44. Relay K-42 is thus operated to open the holding circuit for relay K-39 which then releases. Relay K-43 also operated to open the short across the distributor E-2 at its operated tongue b, conductor 94, and point 18 of level I of the rotary switch RS-3 on which the wipers of this switch are still resting. As a result the next revolution of the distributor E-2, sends out another activating pulse to condition the receiving printer at the tributary station, which became locally grounded during the long interval following the operation of the numbering machine, to receive the message about to be transmitted.

At the end of this revolution of distributor E-2 the probe pulse is transmitted over conductor 103, operated tongue a and right coil of relay K-42 and right winding of relay K-38 to reoperate relay K-38. Ground, having been removed from the starting electrode of tube V-19 at operated tongue d of relay K-42, a holding circuit is now completed through tube V-19 to the left winding of relay K-38, its operated tongue c and conductor 101, to battery at relay K-44. Relay K-38 at its tongue c opens the holding circuit for relay K-43, which releases and reapplies a short to the distributor E-2. The following pulse through transmitter segment X of distributor E-2, conductor 106, operated tongue e of relay K-38, operated tongue a of relay K-42, and its right coil, and the right coil of relay K-38 keeps relay K-42 operated until the end of the pulse, at which time it releases, causing relay K-36 to release and thus shorting tube V-19. Relay K-38, however, remains locked over conductor 107 to ground at tongue b of relay K-36. Thus with relays RA, K-38, K-37 and K-30 operated a circuit is completed for the clutch magnet CM-A of the message transmitter A, from battery at the front contact and tongue a of relay RA, right winding of relay RA, tongue a and back contact of relay RNN, conductor 110, operated tongue a of relay K-38, tongue e and back contact of relay K-42, conductors 109, 108, make-before-break contacts f, associated with tongue d of unoperated relay K-36, conductor 97, operated tongue f of relay K-37, conductor 98, tongue a and back contact of relay K-35, conductor 99, operated armature c of relay K-30 conductor 100, clutch magnet CM-A of text transmitter Txr. A and transmitter control contacts MC to ground. The text transmitter A thereupon operates to transmit its message to the line L through the relay TR.

In the foregoing description reference was made to FIG. 7C for the signal sequence effective to select station No. 2. Had it been desired to selected station No. 6 a signal sequence as shown in FIG. 7D would have been sent, in which the two second dwell occurs following the ninth step pulse.

*Station disconnection*

When tape runs out of the text transmitter A, FIG. 8, the tape contact MC opens which causes the clutch magnet CM-A and relay K-44 to release. Relay K-44 opens the holding circuit for relay K-38 and relay K-38, upon release, opens the short across condenser C-25 of tube V-13, which extended from the cathode side of condenser C-25 over conductor 114, tongue d and front contact of relay K-38, and conductor 115 to the opposite side of condenser C-25, thus grounding the cathode and one side of condenser C-25 through unoperated tongue d of relay K-38 and operated tongue g of relay K-37. Condenser C-25 thus charges to trigger potential rendering tube V-13 conductive through the coil of relay K-35. Relay K-35 operates and locks up over conductor 116, operated tongue h of relay K-37, conductor 117 and operated tongue b of relay K-35. This locking circuit shorts and extinguishes tube V-13. Tube V-13 is timed to operate 30 seconds after the end of message. However, during this interval the operator may effect operation of relay K-35 by depressing the disconnect key DS (FIG. 9) and thus apply ground to relay K-35 over conductor e of cable Z, back contact and tongue e of relay K-31, conductor 118, made tongue h of relay K-38 and conductor 116 to the coil of relay K-35 to operate the same.

Operation of relay K-35 at its tongue c opens the circuit for the operate light I-3 and closes the circuit to the disconnect light I-5. Relay K-35 at its tongue b removes ground from the locking circuit 92 of relay K-30 which then releases. Relay K-31 also operates from ground at released tongue b of relay K-26, back contact and tongue f of relay K-34, conductor 74, made tongue a of relay K-39, conductor 75, tongue d of selector switches S-1, S-2, conductor 78, made tongue d of relay K-35 and conductors 120 and 80 to the winding of relay K-31. This relay locks up over conductors 80, 120, operated tongue d of relay K-35, conductor 78, switches S-1, S-2, conductor 75 and tongue a of relay K-31.

With relay K-31 operated, a probe pulse from distributor E-2 is sent over conductor 65, unoperated tongue g of relay K-32, operated tongue b of relay K-31 and conductor 84 to the stepping magnet K-46 of rotary switch RS-3, which now moves on to its point 19. The removal of ground at point 18, level II, releases relay K-37. The distributor E-2 is unshorted at point 19, level I, causing a space pulse to be sent to the line on the next rotation of the distributor. This is the first or activating character of the disconnect sequence (FIG. 7E). Ground from point 19, level II, conductor 85, unoperated tongue h of relay K-34, conductor d of cable X and tongue e of relay K-32, causes operation of relay K-33. The next probe pulse steps K-46 as before to point 20 where the distributor E-2 is again shorted at level I. With removal of ground at point 19, level II, relay K-33 locks up through its tongue b and right winding of relay K-32 causing relay K-32 to operate. As described in connection with the selection of a station, relay K-32 prevents the probe pulse from operating stepping magnet K-46 and shorts the distributor E-2. Ground from point 20, level II, and conductor 121 operates relay K-28 which locks up through its tongue a and operated tongue a of relay K-32. The next probe pulse knocks down relay K-33 and at the end of the pulse relays K-32 and K-28 release. At the end of the next probe pulse two dwell characters will have been transmitted and stepping switch K-46 operated to step its wipers onto point 21 which at level I unshorts the distributor E-2 to cause a pulse (step 1) to be sent to the line. The rotary switch RS-3 is now stepped around to its point 1 and during this movement the distributor is grounded and ungrounded at level I to send stepping pulses at points 22, 23, 26, 27, 28, 29, 30, 31, 32 and 33, but no pulses at points 24, 25, thereby to produce the disconnect sequence shown in FIG. 7E. At point 1, level I, switch RS-3 again shorts the distributor, and ground at point 1, level II, conductor 122, operated tongue e of relay K-35, and conductor 123 operates release magnet RM of the station selection switches, permitting the operated switch S-1 to S-6 to be returned to normal. The holding circuit for relay K-31 is opened at tongue d of the released switch, such as S-2, and the holding circuit for relay K-35 is opened at released tongue e of relay K-31.

*Invitation timer*

In order to automatically send out invitation sequences to the tributary stations on a periodic basis, a timer E-1 (FIG. 16) is provided which has two sets of cam operated contacts M and N, the former being closed momentarily every ten minutes and the latter being closed nine and one-half minutes later. Upon closure of contacts M, if no invitation cycle is in progress, that is, if relays K-25 and K-26 are unoperated, relay K-23 operates through contacts M, tongue e of relay K-25, conductor d of cable Y and released tongue a of relay K-26, and locks with its contact b in shunt to timer contact M. Relay K-24 is operated nine and one-half minutes later through operated armature a of K-23 and contacts N. If during this nine and one-half minute period relay K-25 operates in response to a request from a tributary station, relay K-23 will release and relay K-24 will not operate. Should relay K-25 not operate during this timed interval, relay K-24 upon operation locks up through its tongue a, conductor 124 and tongue c of relay K-29 to ground. Ground through tongue c of relay K-24 operates relay K-25 which responds to start an invitation cycle in the same manner as in response to a request from a tributary station, except that relay K-24 opens, at its tongue b, the short across the distributor at point 2, level I, of rotary switch RS-1 to thus send a busy pulse preceding the invitation cycle.

Thus, it will be noted that a system has been provided in which any one of a plurality of tributary stations having a message to transmit may initiate the transmission of an invitation cycle from the central office, each such cycle including sufficient invitation sequences, each of a uniform number of open line pulses, to give each station on the way circuit one opportunity to seize the line and transmit thereover. Each of the open line conditions is followed by a short (4 code pulses) closed line condition, a two character dwell or a two second dwell and that the relative length and disposition of these dwells in the invitation sequence selectively controls the tributary station sets to invite each station in succession to transmit. It will be further noted that the number of signal sequences transmitted in each invitation cycle will vary depending upon the number of stations accepting the invitation to transmit, there being one station normalizing sequence, in which a two second dwell follows the tenth step pulse, in addition to each accepted invitation sequence, in which a two second dwell occurs following one or more of the six station identifying steps (4 to 9).

It will be further remembered that the central office may initiate, on a timed basis, an invitation cycle independently of requests from the tributary stations. This cycle may consist of a single invitation sequence, in the event that none of the tributary stations accepts, this single group constituting both the station invitation and station normalizing sequence; or the cycle may include a total of seven signal sequences (six selecting and one restoring) should all six stations accept in turn.

The central office, it will be recalled, may also select any tributary station for transmission thereto by the transmission over the way circuit of a selecting sequence having open line pulses equal in number to those of each invitation sequence and with a two second dwell following the station identifying pulse of the station to be selected. The selected station is automatically cut out at the end of transmission by a cutting-out or station normalizing sequence.

It will be understood that many variations in the detailed circuits and equipment for effecting the operation defined may be made without departing from the spirit or essential attributes of the invention which is not to be limited except in accordance with the specific limitations of the claims.

What is claimed is:

1. A telegraph system comprising a central office, a plurality of tributary stations, a way circuit connecting each of said central office with said tributary stations, a message transmitter at each of said tributary stations, a message recorder at the central office, each of said message transmitters being normally inoperative over said way circuit, selective control means at each tributary station to select such station for operation of its transmitter over the way circuit, means at the central office for sending an invitation to transmit sequence of alternate spacing and marking intervals to said tributary stations, said sequence including at least one spacing and one marking interval individual to each tributary station on the way circuit, said selective control means at each station being responsive to said invitation sequence to effect a cycle of operation and further responsive to its individual spacing and marking intervals to select its station for transmission over the way circuit whenever said station has a message waiting to be transmitted, other means in the selected station initiated into operation during such individual spacing and marking intervals to transmit an invitation acceptance signal to said central office and means at the central office responsive to said acceptance signal to modify the length of succeeding marking intervals of said invitation sequence in a manner to prevent selection of other stations on said way circuit for transmission, said selective control means being further responsive to the termination of said invitation sequence to initiate the transmitter of the selected station into operation.

2. A telegraph system as defined in claim 1 in which means is provided at each tributary station to initiate operation of said means at the central office for sending said invitation sequence.

3. A telegraph system as defined in claim 1 in which means is provided at the central office responsive to cessation of operation of a tributary station transmitter to initiate another invitation sequence.

4. A telegraph system as defined in claim 3 in which means is provided to modify the spacing and marking intervals of said other invitation sequence so as to preclude the selection for operation of the previously selected station transmitter.

5. A telegraph system comprising a central office, a plurality of tributary stations, a way circuit connecting said central office with said tributary stations, a message transmitter at each of said tributary stations, a message recorder at the central office, each of said message transmitters being normally inoperative over said way circuit, selective control means at each tributary station to condition its transmitter for operation over the way circuit when it has a message waiting, means at the central office for sending over said way circuit an invitation sequence of a fixed number of open and closed line intervals, including a station identifying open and closed line interval individual to each station on the way circuit, said selective control means at each station comprising means responsive at successive stations to successive ones of said station identifying intervals, when the closed line portion thereof is of predetermined length, to enable each station in succession to accept the invitation to transmit, means at each station initiated into operation upon such acceptance by the station, for transmitting a signal to said central office during the station identifying interval of the accepting station, means at the central office responsive to said last mentioned signal for varying the length of succeeding station identifying closed line intervals whereby to preclude the acceptance by succeeding stations, and means initiated into operation at the end of said invitation sequence to initiate operation of the accepting station transmitter over said way circuit to transmit permutation code signals thereover.

6. A telegraph system as defined in claim 5, having means at said central office automatically responsive to cessation of said permutation code signals for repeating said invitation sequence, and means at said central office for rendering the station identifying closed line interval of the last selected and all previously invited stations incapable of station acceptance during said repeated invitation sequence.

7. A telegraph system as defined in claim 5 having means at said central office for repeating said invitation sequence following each cessation of said permutation code signal from a transmitting station until each tributary station has had one opportunity to accept, and further means for interrupting the transmission of said invitation sequences when no station accepts in the last transmitted sequence.

8. A telegraph system as defined in claim 5, having means at each tributary station for transmitting a sequence request signal to said central office to initiate an invitation sequence and means to render said last means ineffective during the transmission of such an invitation sequence.

9. A telegraph system comprising a central office, a plurality of tributary stations, a way circuit connecting said central office with said tributary stations, a message transmitter at the central office, a message recorder at each tributary station, said transmitter and each of said recorders normally being inoperative over said way circuit, selective control means at each tributary station responsive to station selection signals received over said way circuit for rendering the tributary station recorder operable by signals received over said way circuit, means at said central office for sending station selection signals over said way circuit, said last means comprising a tributary station selection switch individual to each station, signal generating means for producing station selection signals comprising a sequence of open and closed line conditions including at least one open condition individual to each tributary station and means including said selection switches for selectively modifying the length of said closed line conditions in accordance with the station to be selected and means effective upon the selection of a station for rendering said central office transmitter operable over said way circuit.

10. A telegraph system as defined in claim 9 in which means is provided at each tributary station under control of said selective control means in response to a station selection signalling condition to transmit an answer back signal to said central office during one of said closed line conditions and means at said central office responsive to said answer back signal and effective at the end of the transmission of said station selection signals for activating said last means for rendering said transmitter operable over said way circuit for transmission of message signals thereover.

11. A telegraph system as defined in claim 10 having means responsive to the cessation of operation of said transmitter to rendering said transmitter unoperable over said way circuit.

12. A telegraph system as defined in claim 11 having other means responsive to cessation of operation of said transmitter for sending station cut-out signals comprising a sequence of open line conditions, and means including said selective control means at a selected station responsive to said cut-out signals for rendering the recorder at such station unoperable over said way circuit.

13. A telegraph system as defined in claim 12 in which said station selection and station cut-out signals each comprise a fixed number of open line conditions irrespective of the station selected and cut-out.

14. A telegraph system comprising a central office, a plurality of tributary stations, a half-duplex way circuit connecting said central office with said tributary stations, a message transmitter and a message recorder at each tributary station normally inoperative over said way circuit, a transmitter and a recorder at said central office, said last transmitter being normally inoperatively associated with the way circuit, means at each tributary station for conditioning the transmitter thereat for operation when a message is awaiting transmission therefrom, means at the central office for transmitting a station invitation sequence of open and closed line conditions having a fixed number of open line intervals for inviting each of said tributary stations in turn to transmit, means at each tributary station responsive to said sequence of open and closed line conditions for accepting said invitation and for initiating the operation of a conditioned transmitter, means responsive to said acceptance by one station for precluding acceptance by any other station, means at said central office for transmitting a station selection sequence of open and closed line conditions having a fixed number of open line intervals for selecting any way station, means at said central office effective upon completion of said station selection for rendering the central office transmitter operable over said way circuit for transmission of messages thereover, means at said selected tributary station for rendering the recorder thereat operable over the way circuit to record such messages, and means for preventing the transmission of station selection signals over said way circuit when one of said tributary stations is transmitting to said central office.

References Cited in the file of this patent
UNITED STATES PATENTS

| | | |
|---|---|---|
| 2,478,361 | Bartelink | Aug. 9, 1949 |
| 2,501,063 | Levin | Mar. 21, 1950 |
| 2,514,889 | McGoffin | July 11, 1950 |
| 2,543,608 | Stamper | Feb. 27, 1951 |
| 2,568,836 | Tobler | Sept. 25, 1951 |
| 2,575,329 | Blanton | Nov. 20, 1951 |
| 2,754,495 | Sprecker | July 10, 1956 |